US012700067B1

(12) United States Patent
Ariza et al.

(10) Patent No.: US 12,700,067 B1
(45) Date of Patent: Aug. 4, 2026

(54) STENCIL BASED BLURRING

(71) Applicant: Apple Inc., Cupertino, CA (US)

(72) Inventors: Yujin R. Ariza, Cupertino, CA (US); Nathan P. Rowe, Erie, CO (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 18/244,453

(22) Filed: Sep. 11, 2023

Related U.S. Application Data

(60) Provisional application No. 63/405,588, filed on Sep. 12, 2022.

(51) Int. Cl.
*G06T 5/70* (2024.01)
*G06T 5/92* (2024.01)
(52) U.S. Cl.
CPC . *G06T 5/70* (2024.01); *G06T 5/92* (2024.01)
(58) Field of Classification Search
None
See application file for complete search history.

(56) References Cited

U.S. PATENT DOCUMENTS

| | | | | |
|---|---|---|---|---|
| 8,243,096 | B2 * | 8/2012 | Fowler | G06T 15/40 |
| | | | | 345/619 |
| 10,453,170 | B2 * | 10/2019 | Toth | G06T 1/20 |
| 2003/0077530 | A1 * | 4/2003 | Fujiwara | B82Y 40/00 |
| | | | | 430/30 |
| 2014/0362075 | A1 * | 12/2014 | Howell | G06T 17/00 |
| | | | | 345/419 |

* cited by examiner

*Primary Examiner* — Dov Popovici
(74) *Attorney, Agent, or Firm* — Fernando & Partners, LLP

(57) ABSTRACT

A method is performed at an electronic device with a non-transitory memory and one or more processors. The method includes obtaining a stencil that includes a plurality of reference values respectively indicative of a plurality of blur planes. The method includes, for each of the plurality of reference values, rendering a respective portion of content associated with a corresponding blur plane, in order to generate a respective portion of a blur render. For example, a respective portion of content has a greater depth than a corresponding blur plane. The method includes blurring the respective portions of the blur render to generate blurred content.

20 Claims, 22 Drawing Sheets

400

Obtain a stencil that includes a plurality of reference values respectively indicative of a plurality of blur planes — 402

Sort the plurality of blur planes — 403

Retrieve from a stencil buffer — 404

For each of the plurality of reference values, identify a respective portion of content associated with a corresponding blur plane — 406

Based on relative depths — 408

Based on overlap in xy space with the corresponding blur plane — 410

Sort a plurality of content layers of the content — 411

Based on color characteristic(s) — 412

Render the respective portions of content to generate respective portions of a blur render — 414

Blur the respective portions of the blur render — 416

Render the remaining portions of content to generate respective portions of a non-blur render — 418

Display the blurred content and the non-blur render — 420

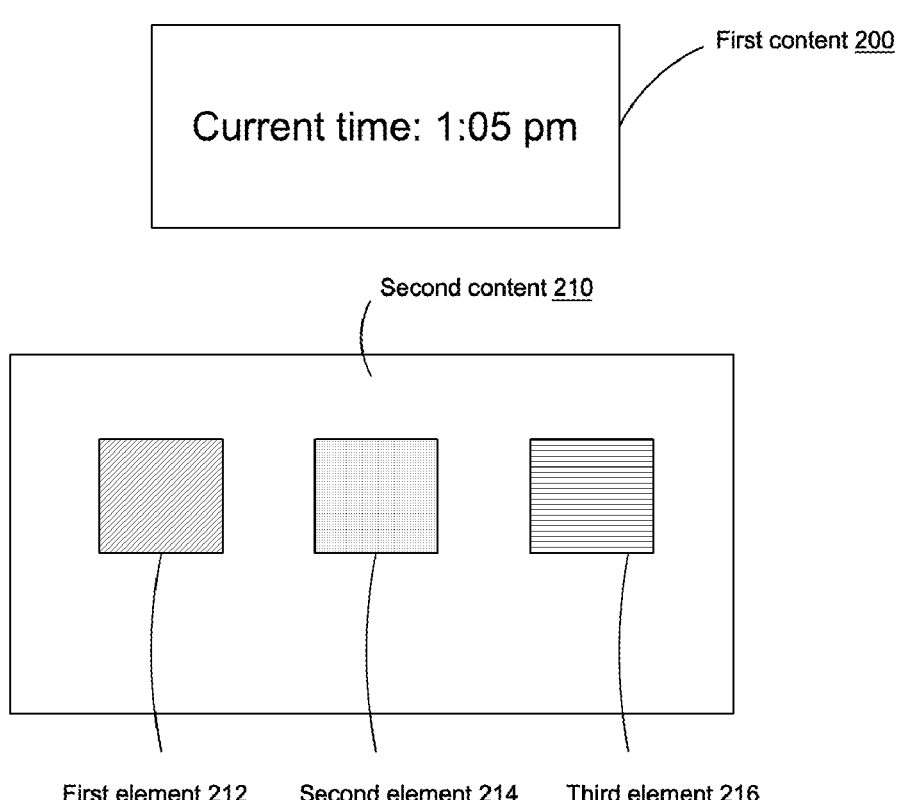
First content 200
Current time: 1:05 pm
Second content 210
First element 212     Second element 214     Third element 216
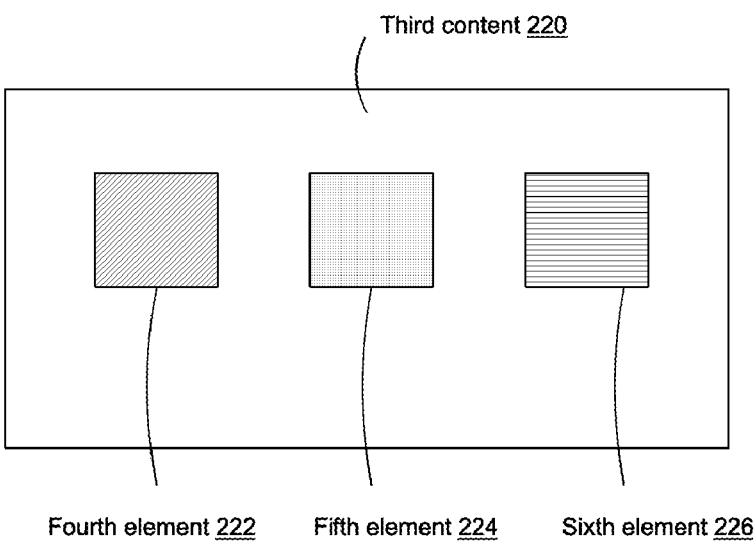
Third content 220
Fourth element 222     Fifth element 224     Sixth element 226
Figure 2A

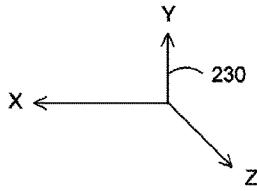
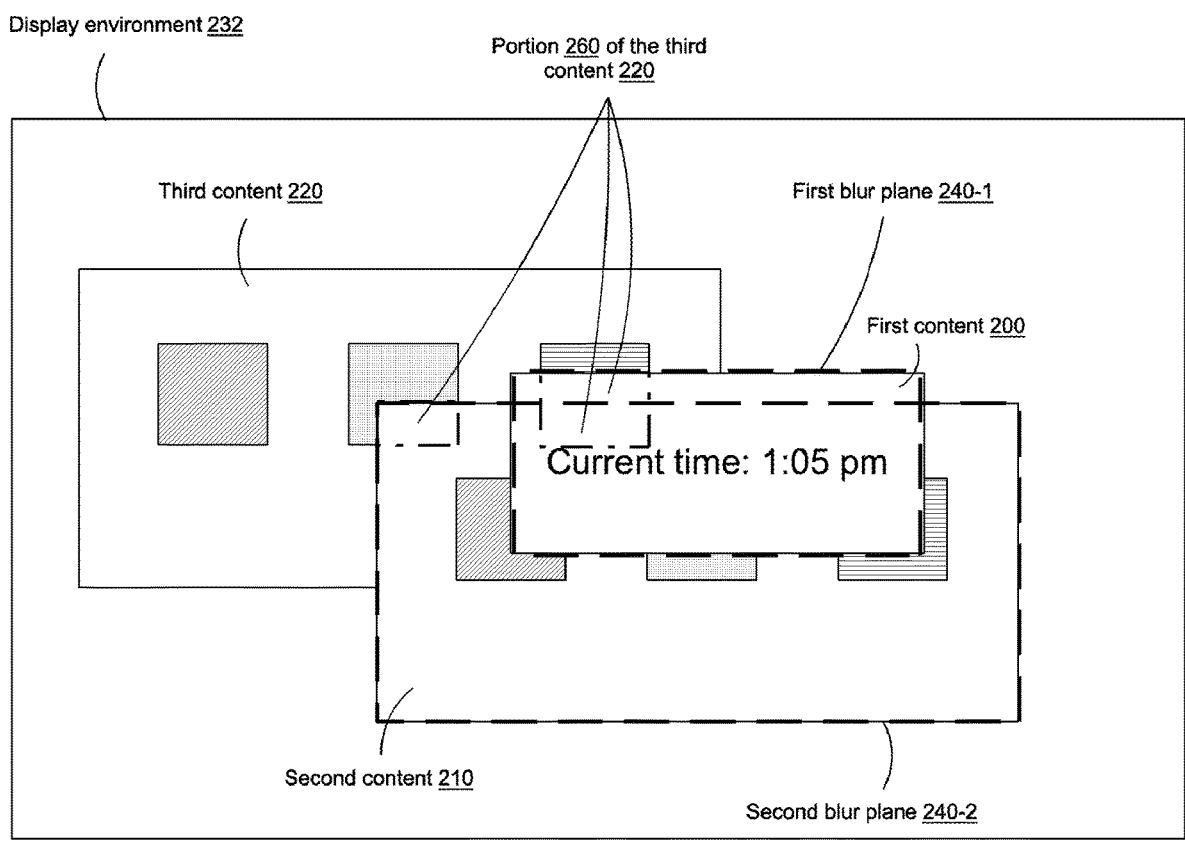
Figure 2E

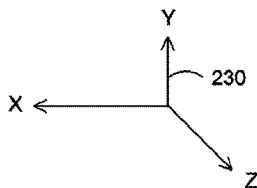
Display environment 232
First portion 262 of the blur
render 122
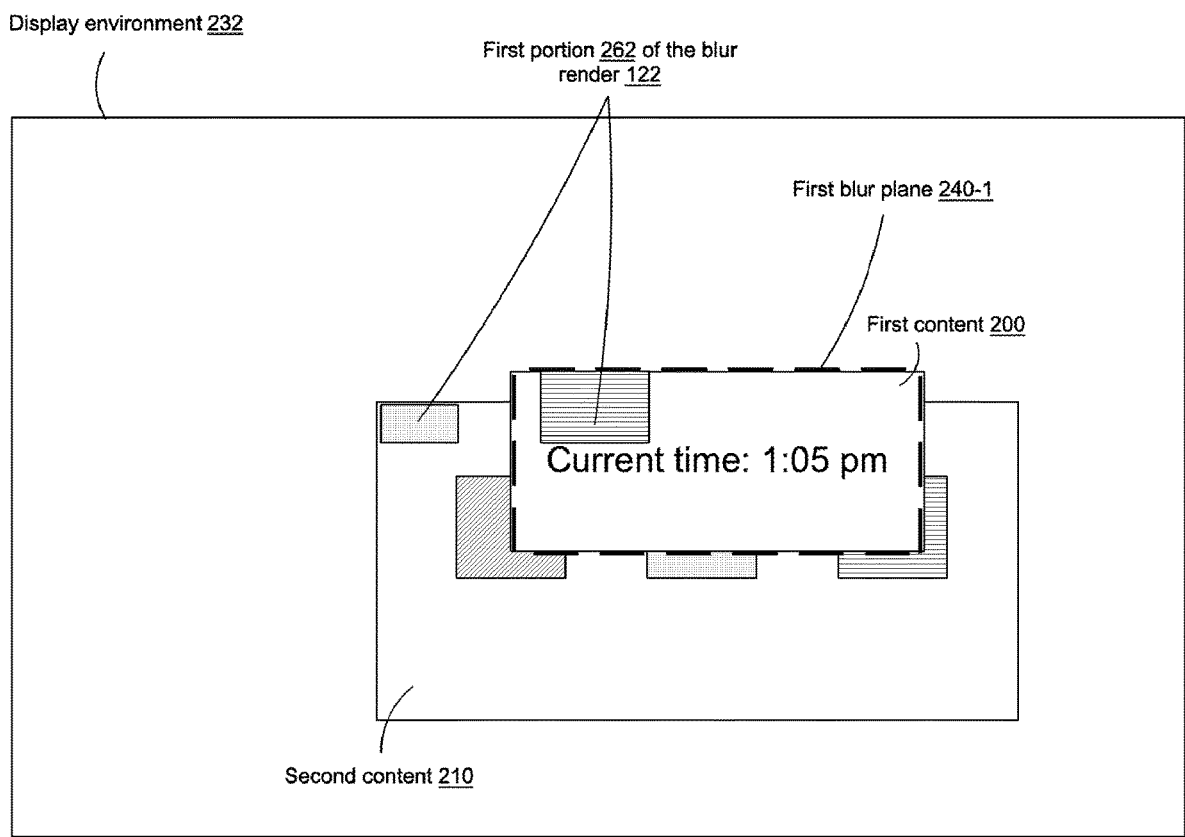
First blur plane 240-1
First content 200
Current time: 1:05 pm
Second content 210
Figure 2F Stencil 300

Set of pixels 302

Stencil 300

Set of pixels 302

400

500

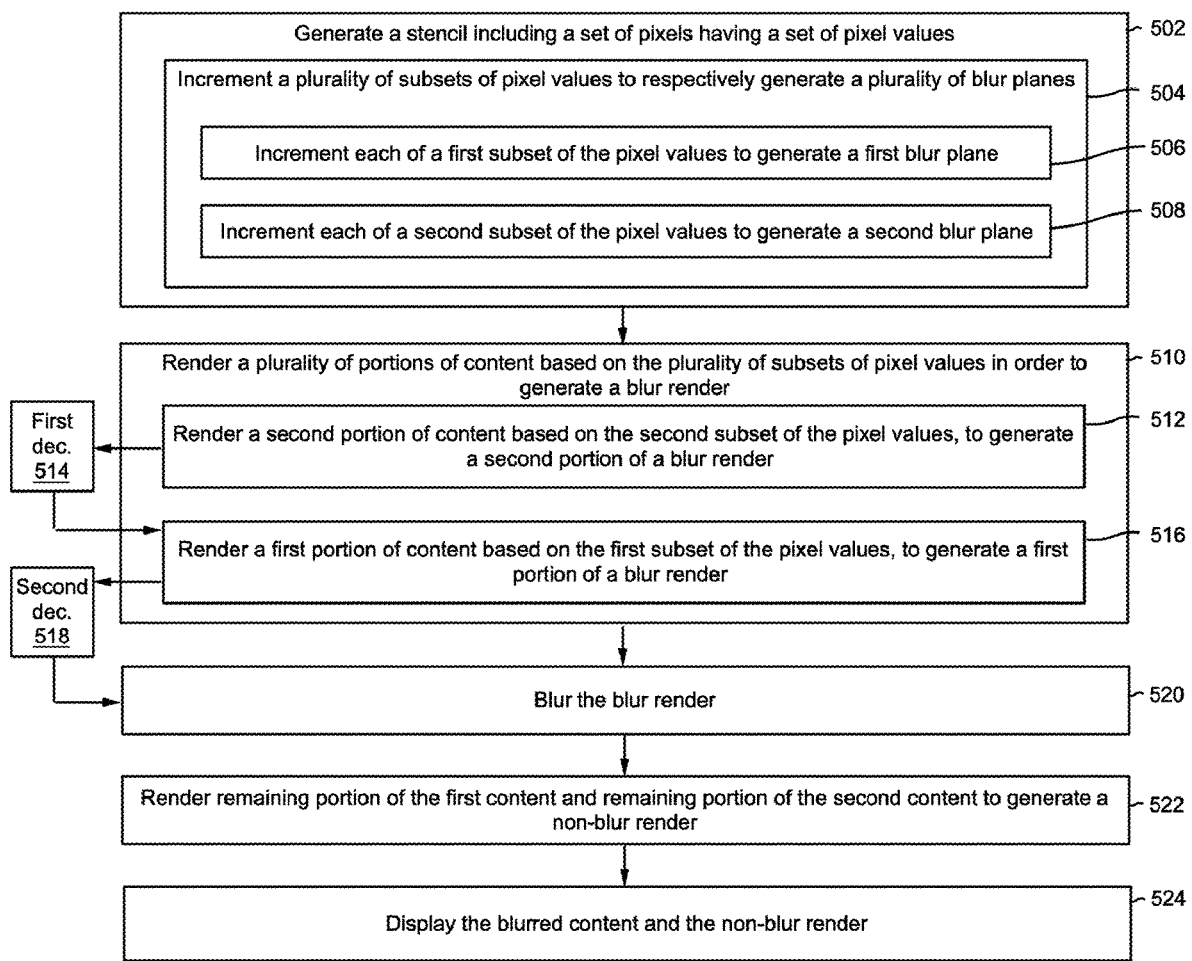

Generate a stencil including a set of pixels having a set of pixel values — 502

Increment a plurality of subsets of pixel values to respectively generate a plurality of blur planes — 504

Increment each of a first subset of the pixel values to generate a first blur plane — 506

Increment each of a second subset of the pixel values to generate a second blur plane — 508

Render a plurality of portions of content based on the plurality of subsets of pixel values in order to generate a blur render — 510

Render a second portion of content based on the second subset of the pixel values, to generate a second portion of a blur render — 512

First dec. 514

Render a first portion of content based on the first subset of the pixel values, to generate a first portion of a blur render — 516

Second dec. 518

Blur the blur render — 520

Render remaining portion of the first content and remaining portion of the second content to generate a non-blur render — 522

Display the blurred content and the non-blur render — 524

Figure 5

Stencil 600

Plurality of reference
values 602

STENCIL BASED BLURRING

CROSS-REFERENCE TO RELATED APPLICATIONS

This application claims the benefit of U.S. Provisional Patent App. No. 63/405,588, filed on Sep. 12, 2022, which is incorporated by reference in its entirety.

TECHNICAL FIELD

The present disclosure relates to rendering content, and, in particular, blurring rendered content.

BACKGROUND

Various techniques include blurring rendered content, and displaying the blurred content in a three-dimensional (3D) display environment. In some circumstances, first rendered content partially overlaps with second rendered content (e.g., in xy space), thereby introducing challenges in blurring the overlapping rendered content. One technique includes performing multiple blur operations, one for each of the overlapping rendered content. For example, rendering the first content, performing a first blurring operation of the first rendered content, rendering the second content, and performing a second blurring operation of the second rendered content. However, performing the multiple blur operations is computationally expensive.

SUMMARY

In accordance with some implementations, a method is performed at an electronic device with a non-transitory memory and one or more processors. The method includes obtaining a stencil that includes a plurality of reference values respectively indicative of a plurality of blur planes. The method includes, for each of the plurality of reference values, rendering a respective portion of content associated with a corresponding blur plane, in order to generate a respective portion of a blur render. For example, a respective portion of content has a greater depth than a corresponding blur plane. The method includes blurring the respective portions of the blur render to generate blurred content.

In accordance with some implementations, a method is performed at an electronic device with a non-transitory memory and one or more processors. The method includes generating a stencil that includes a set of pixel values respectively associated with a set of pixels of the stencil. Generating the stencil includes incrementing a plurality of subsets of pixel values to respectively generate a plurality of blur planes. The method includes rendering a plurality of portions of content based on the plurality of subsets of pixel values to generate a blur render. Each of the plurality of portions of content is associated with a corresponding blur plane of the plurality of blur planes. The method includes, in response to rendering each of the plurality of the portions of the content, decrementing a respective subset of pixel values associated with the corresponding blur plane. The method includes blurring the blur render to generate blurred content.

In accordance with some implementations, an electronic device includes one or more processors and a non-transitory memory. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2J are examples of blurring rendered content based on a stencil in accordance with some implementations.

FIG. 5 is a second example of a flow diagram of a method of blurring rendered content based on a stencil in accordance with some implementations.

DESCRIPTION OF IMPLEMENTATIONS

Figure 1A:
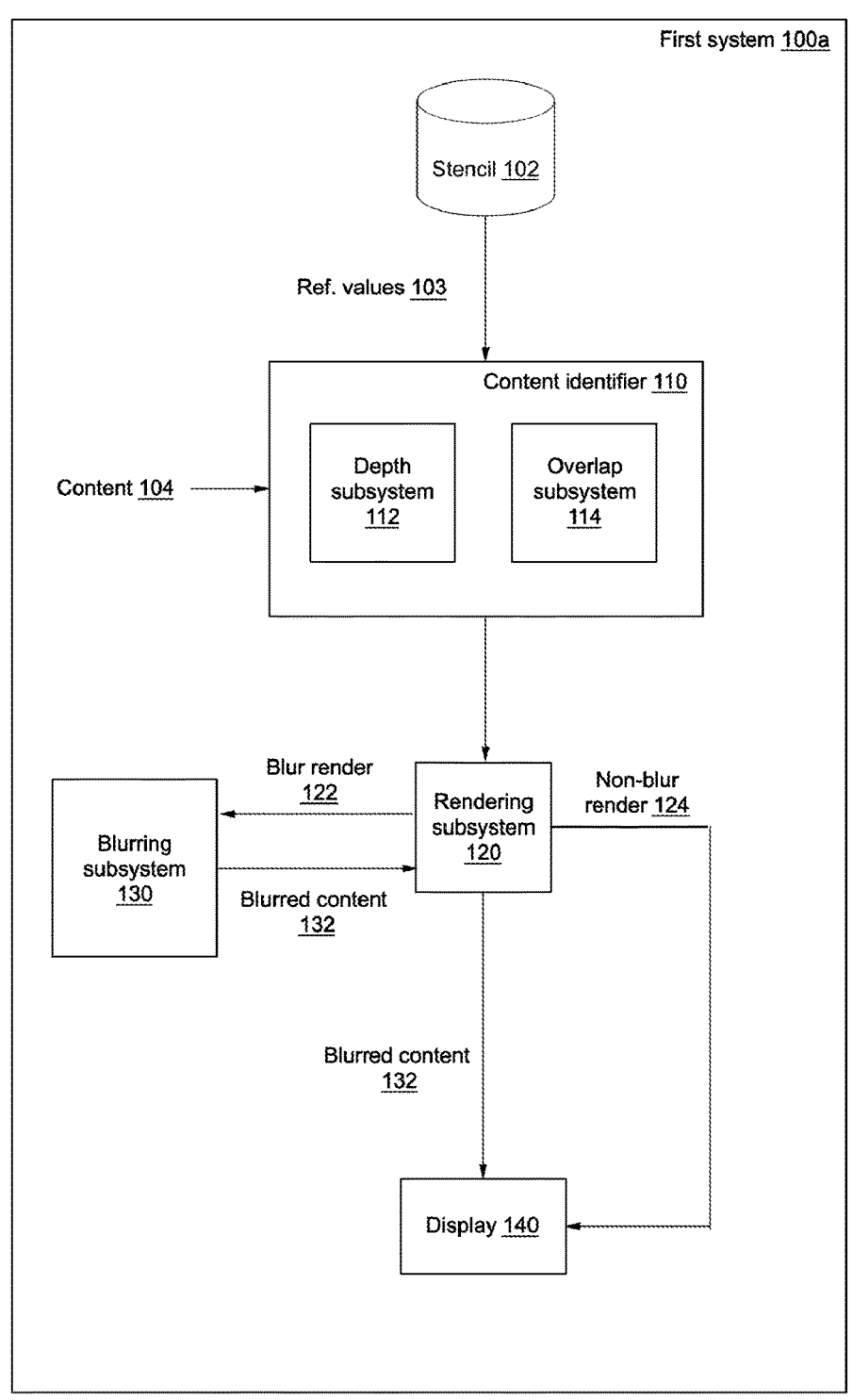
FIG. 1A is a block diagram of an example of a first system for blurring rendered content based on a stencil in accordance with some implementations.

Various techniques include blurring rendered content for display in a three-dimensional (3D) display environment. For example, a device concurrently displays blurred rendered content, unblurred rendered content, and image data of a physical environment, in order to display an augmented reality (AR) environment or a mixed reality (MR) environment. In some circumstances, first rendered content at least partially overlaps with second rendered content, such as within an overlapping region in xy space. Although the first rendered content may not overlap with the second rendered content in z space (e.g., depth from the device), the overlap nonetheless introduces challenges in blurring the overlapping rendered content. For example, a technique may include performing multiple blur operations to account for the overlap, which is computationally expensive. Namely, the technique may include rendering the first content, performing a first blurring operation on the first rendered content, rendering the second content, and performing a second blurring operation on the second rendered content.

By contrast, various implementations disclosed herein include methods, electronic devices, and systems for stencil-based blurring of respective portions of rendered content. For example, in some implementations, a method includes obtaining a stencil that includes a plurality of reference values respectively indicative of a plurality of blur planes. For example, a first reference value uniquely indicates a first blur plane, a second reference value uniquely indicates a second blur plane, a third reference value uniquely indicates a third blur plane, etc. Moreover, the method includes cycling through each of the plurality of reference values, in order to identify and render a respective portion of content that corresponds to a respective blur plane. Continuing with the previous example, for the first reference value, the method includes rendering a first portion of content that is at a greater depth (e.g., greater z value) than the first plane and that spatially overlaps with the first blur plane in xy space. Continuing with this example, for the second reference value, the method includes rendering a second portion of content that is at a greater depth (e.g., greater z value) than the second blur plane and that spatially overlaps with the second blur plane in the xy space. Moreover, continuing with the example, the method includes blurring the rendered first and second portions of the content. Accordingly, rather than performing two successive blurring operations, the method includes rendering portions of content based on a stencil, and then blurring the rendered portions via a single blurring operation.

As another example, in some implementations, a method includes generating a stencil that indicates a plurality of blur planes via a plurality of pixel values of the stencil. Generating the stencil includes incrementing a plurality of subsets of pixel values to respectively generate a plurality of blur planes. Each of the plurality of subsets of pixel values may correspond to a distinct subset of pixel values of the plurality of pixel values. For example, each of a first subset of pixel values of a first subset of pixels is incremented from zero to one, in order to generate a first blur plane at a location corresponding to the first subset of pixels. As another example, each of a second subset of pixel values of a second subset of pixels is incremented, in order to generate a second blur plane at a location corresponding to the second subset of pixels. In this example, a pixel value of a particular pixel of the second subset of pixels may be incremented from zero to one, or may be incremented from one to two. The pixel value being incremented from zero to one indicates the second blur plane, but not the first blur plane, exists at the particular pixel. On the other hand, the pixel value being incremented from one to two indicates that both the first and second blur planes exist at the particular pixel—e.g., the first blur plane overlaps with the second blur plane at the particular pixel of the stencil. Moreover, the method includes rendering a plurality of portions of content based on the plurality of subsets of pixel values to generate a blur render. Each of the plurality of portions of content is associated with a corresponding blur plane of the plurality of blur planes. Moreover, each of the plurality of portions of content is associated with a corresponding portion of the blur render. In response to rendering each of the plurality of the portions of the content, the method includes decrementing a respective subset of pixel values associated with the corresponding blur plane. Continuing with the previous example, in response to rendering second content corresponding to the second blur plane, the method includes decrementing each of the second subset of pixel values, and, in response to the decrementing, rendering the first content corresponding to the first blur plane.

Reference will now be made in detail to implementations, examples of which are illustrated in the accompanying drawings. In the following detailed description, numerous specific details are set forth in order to provide a thorough understanding of the various described implementations.

However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

FIG. 1A is a block diagram of an example of a first system 100a for blurring rendered content based on a stencil in accordance with some implementations. In some implementations, the first system 100a is integrated in an electronic device, such as a mobile device (e.g., a smartphone, a tablet, etc.) or a head-mountable device (HMD).

In some implementations, the first system 100a includes a stencil datastore 102, which stores the stencil.

Figure 6A:
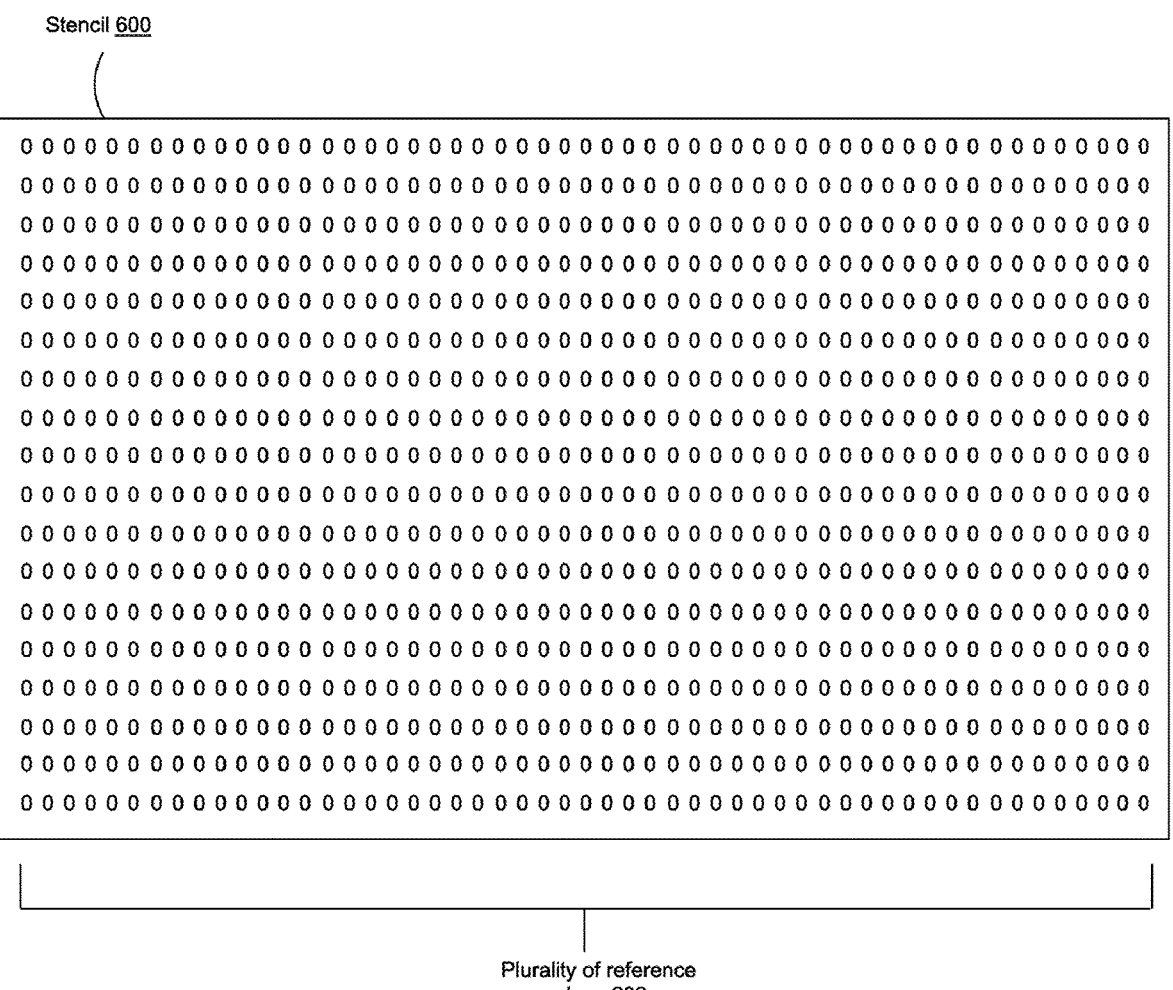
FIGS. 6A-6C are an example of generating a stencil in accordance with some implementations.
Figure 6B:
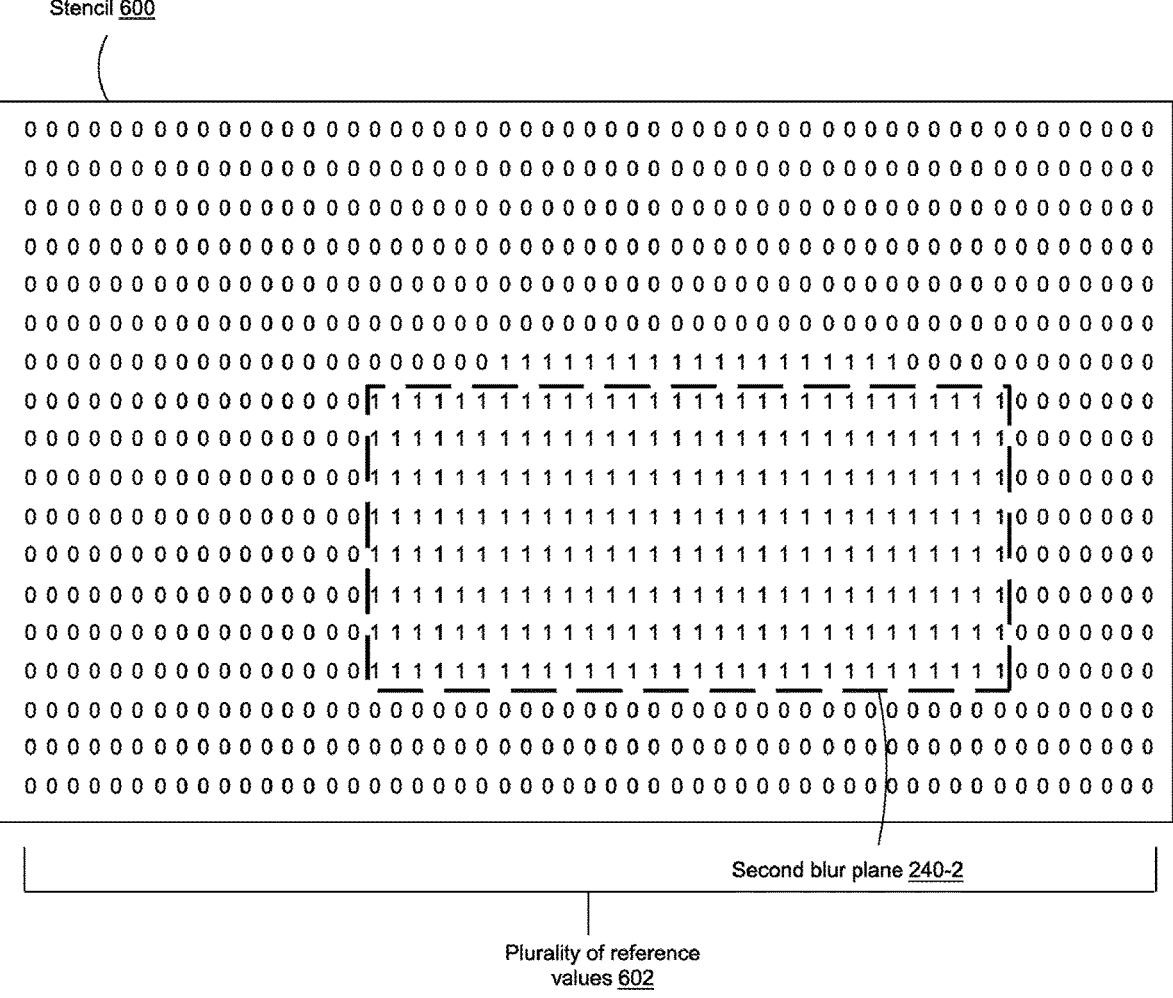
Figure 6C:
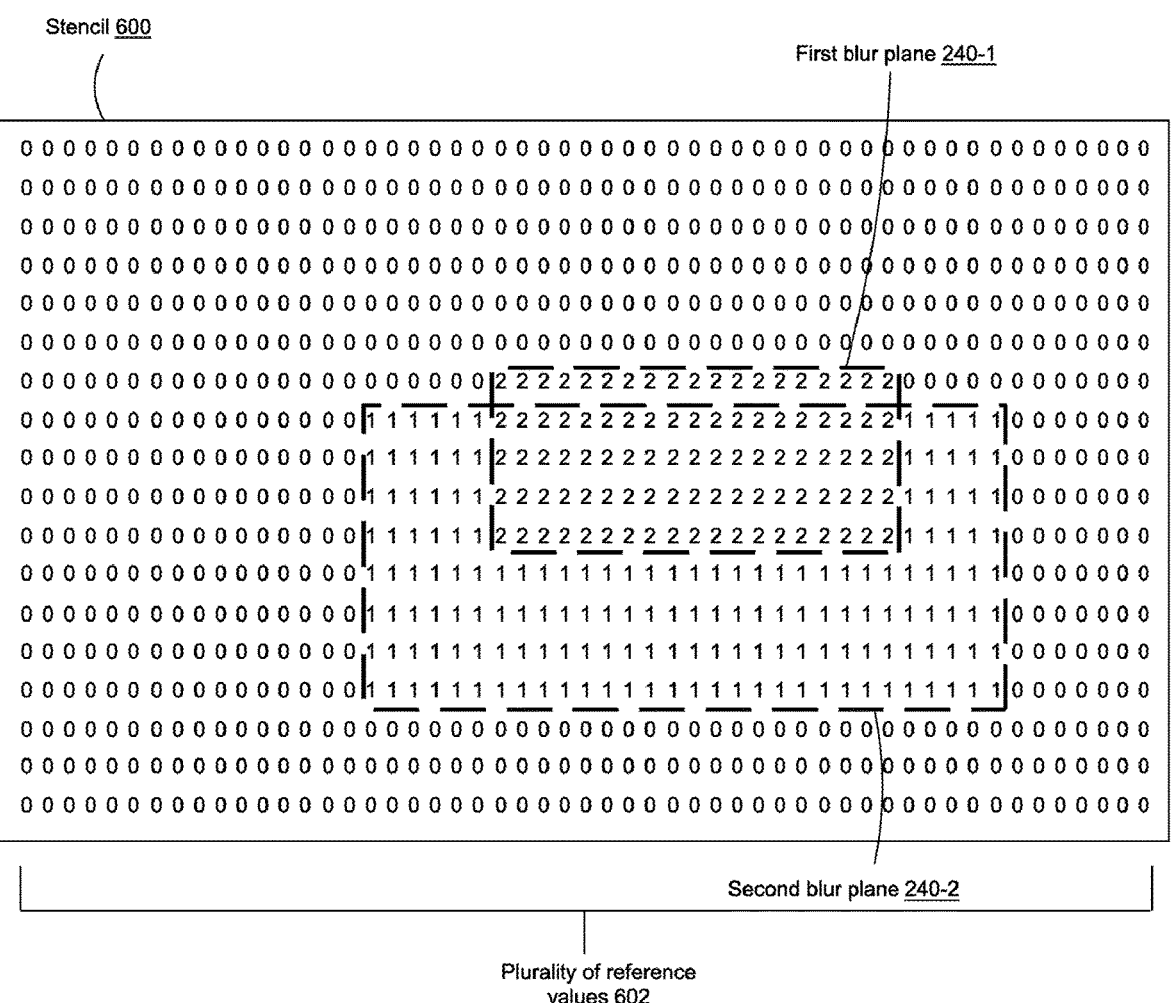

One example of the first system 100a generating the stencil is illustrated in FIGS. 6A-6C. Referring to FIG. 6A, the first system 100a initializes a stencil 600 by setting each of a plurality of reference values 602 of the stencil 600 to zero. As illustrated in FIG. 6B, the first system 100a assigns a reference value of one to a subset of the plurality of reference values 602 corresponding to the second blur plane 240-2. Moreover, as illustrated in FIG. 6C, the first system 100a assigns a reference value of two to a subset of the plurality of reference values 602 corresponding to the first blur plane 240-1. To that end, in some implementations, the first system 100a sorts the plurality of blur planes based on respective depths of the plurality of blur planes. For example, the first system 100a sorts, from back to front (e.g., highest depth to lowest depth), the second blur plane 240-2 behind the first blur plane 240-1. In contrast to the increment-driven example of generating a stencil 300 described below with reference to FIGS. 3A-3E, the stencil 600 indicates each of the plurality of the blur planes using a distinct value. One of ordinary skill in the art will appreciate that the stencil 600 may indicate a particular blur plane with any reference value, so long as the reference value is different from other reference values used to indicate other blur planes. Accordingly, in some implementations, the stencil 600 indicates the second blur plane 240-2 with a reference value other than one, and indicates the first blur plane 240-1 with a reference value other than two.

Referring back to FIG. 1A, as will be described in greater detail with reference to FIGS. 2A-2J, the first system 100*a* uses a plurality of reference values 103 of the stencil to blur certain rendered content according to various implementations. To that end, in some implementations, the first system 100*a* includes a content identifier 110 that identifies portions of content 104 based on the stencil. In order to facilitate the content identification, the content identifier 110 may include a depth subsystem 112 and/or an overlap subsystem 114. The identified portions of the content may be rendered via a rendering subsystem 120, in order to generate a blur render 122. For example, the rendering subsystem 120 includes a graphics processing unit (GPU) that performs the rendering. In some implementations, the rendering subsystem 120 is configured to also generate a non-blur render 124, corresponding to remaining portions of the content 104 that were not identified by the content identifier 110. The first system 100*a* includes a blurring subsystem 130 that blurs the blur render 122, in order to generate blurred content 132. The blurring system 130 provides the blurred content 132 to the rendering subsystem 120, which, in turn, provides the blurred content 132 to a display 140 for display. The rendering subsystem 120 may also provide the non-blur render 124 to the display 140 for display.

Figure 1B:
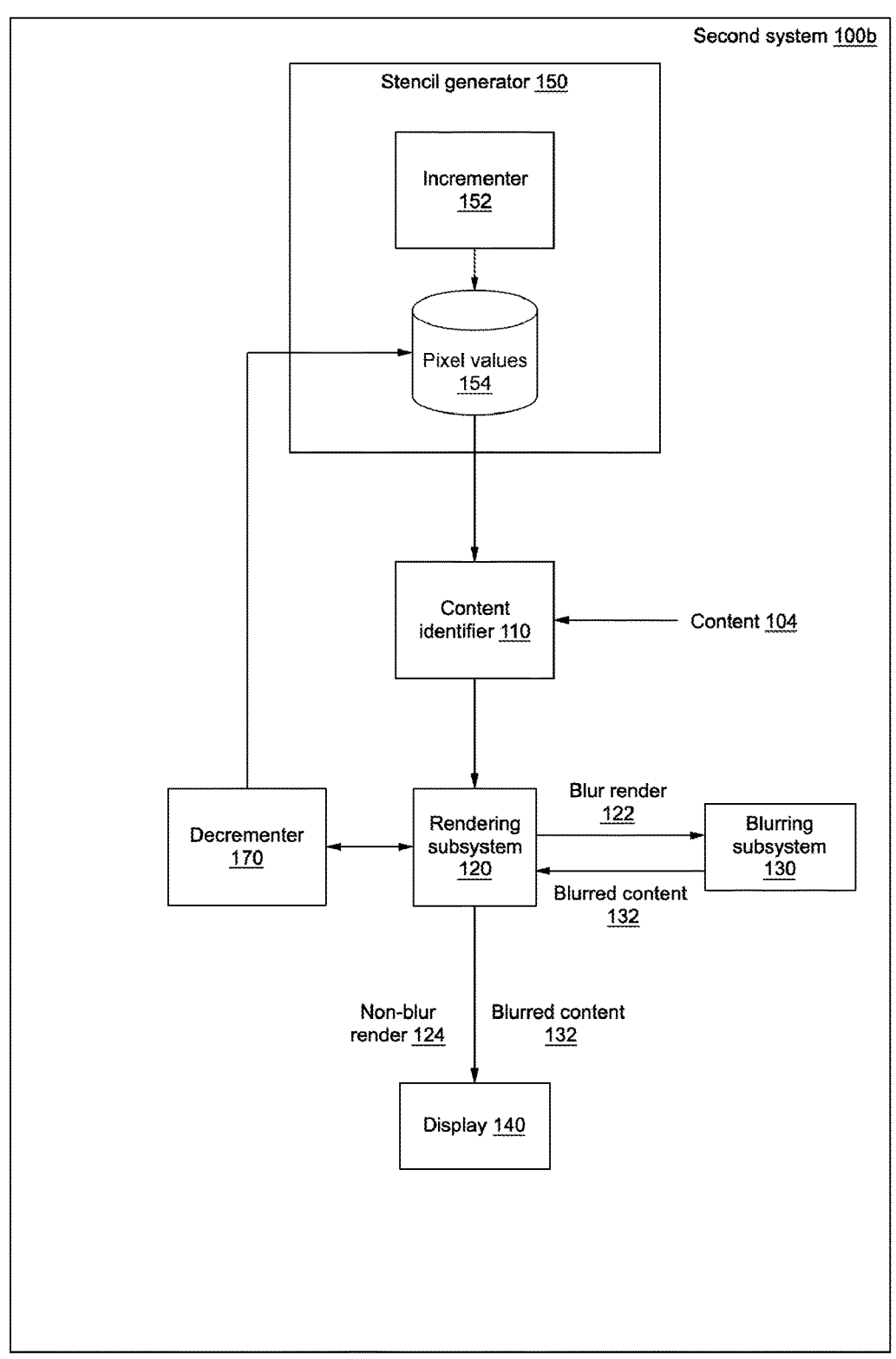
FIG. 1B is a block diagram of an example of a second system for blurring rendered content based on a stencil in accordance with some implementations.

FIG. 1B is a block diagram of an example of a second system 100*b* for blurring rendered content based on a stencil in accordance with some implementations. In some implementations, the second system 100*b* is integrated in an electronic device, such as a mobile device (e.g., a smartphone, a tablet, etc.) or a head-mountable device (HMD).

In some implementations, the second system 100*b* includes a stencil generator 150 that generates the stencil. In some implementations, the stencil includes a set of pixel values respectively associated with a set of pixels of the stencil, such as is described with reference to FIGS. 3A-3E. As will be described in greater detail with reference to FIGS. 2A-2J and 3A-3E, the second system 100*b* uses pixel values of the stencil to blur certain rendered content according to various implementations. To that end, the stencil generator 150 includes an incrementer 152 that increments certain subsets of pixel values, and may also include a pixel value datastore 154 that stores the pixel values of the stencil. Moreover, the second system 100*b* may include the content identifier 110 for identifying portions of the content 104 to be blurred. In various implementations, the content identifier 110 of the second system 100*b* may include the depth subsystem 112 and/or the overlap subsystem 114. The second system 100*b* may also include the rendering subsystem 120 to render the identification portions of the content 104 to generate the blur render 122, and to render remaining (e.g., unidentified) portions of the content 104 to generate the non-blur render 124. The second system 100*b* may also include the blurring subsystem 130 to blur the blur render 122, thereby generating the blurred content 132. Moreover, the second system 100*b* may include the display 140 for displaying the blurred content 132 and the non-blur render 124.

FIGS. 2A-2J are examples of blurring rendered content based on a stencil in accordance with some implementations. In some implementations, the examples described with reference to FIGS. 2A-2J are performed by the first system 100*a*. In some implementations, the examples described with reference to FIGS. 2A-2J are performed by the second system 100*b*.

As illustrated in FIG. 2A, content (e.g., the content 104) includes first content 200, second content 210, and third content 220. Each of the first content 200, the second content 210, and the third content 220 may be partially transparent. The first content 200 corresponds to a current time interface, indicating the current time is 1:05 pm. The second content 210 corresponds to a first user interface, which includes a first element 212, a second element 214, and a third element 216. The third content 220 corresponds to a second user interface, which includes a fourth element 222, a fifth element 224, and a sixth element 226. In some implementations, a particular element corresponds to a user selectable affordance, such as a button for updating display of the time interface (e.g., changing from a digital time indicator to an analog time indicator). One of ordinary skill in the art will appreciate that the content may include any type of partially transparent content, and may include any number of a plurality of content.

Figure 2B:
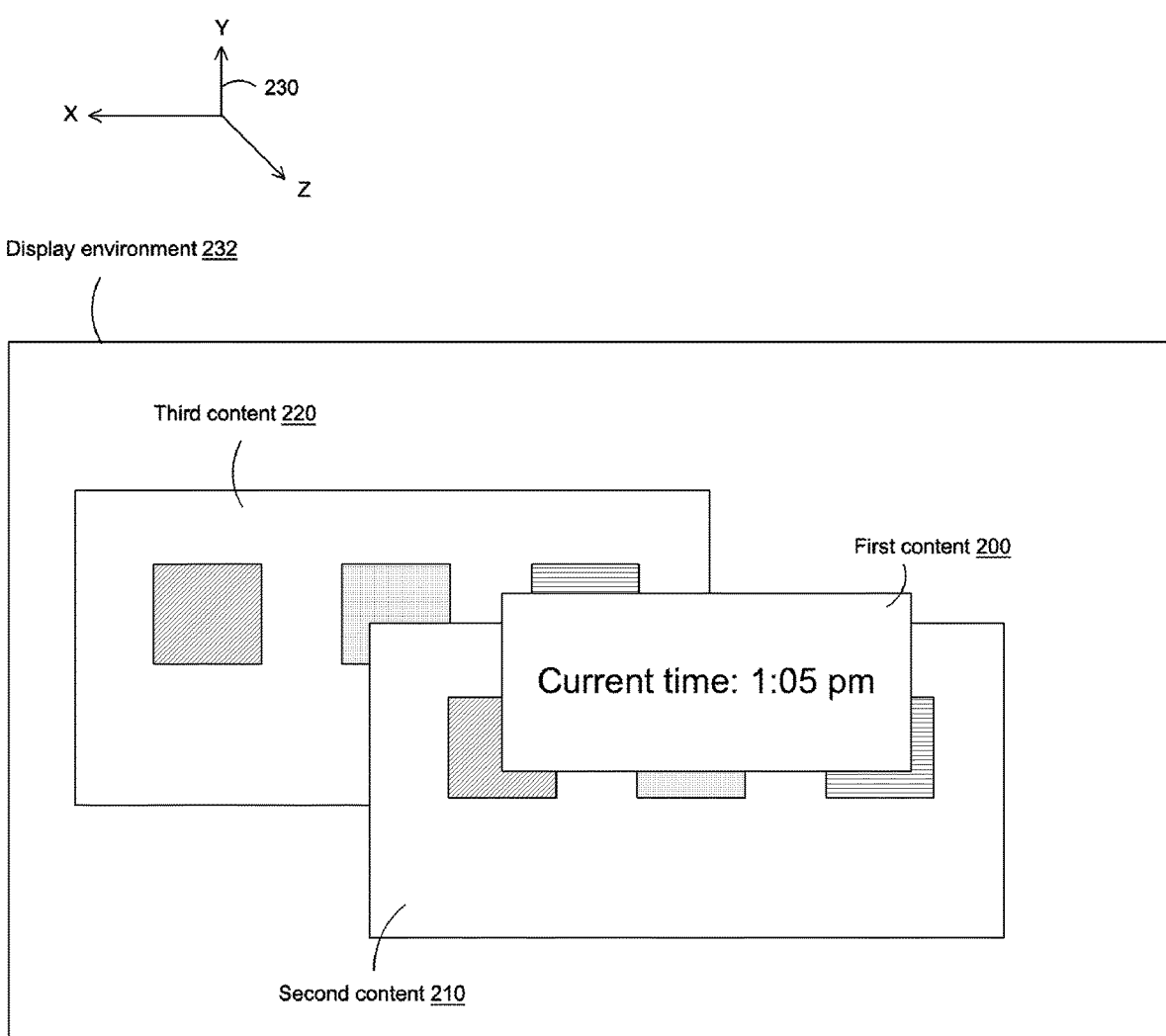

As indicated in FIG. 2B, a display environment 232 shows respective positions of the first content 200, the second content 210, and the third content 220. Respective indicia of the first element 212, the second element 214, the third element 216, the fourth element 222, the fifth element 224, and the sixth element 226 are omitted from FIGS. 2B-2J for the sake of clarity. The display environment 232 shows relative positions of the first content 200, the second content 210, and the third content 220 in three-dimensional (3D) space, and is indicated by 3D reference coordinates 230. Notably, each content is associated with a different z value (e.g., a different depth from the display 140). In particular, the third content 220 is associated with the highest z value (highest depth), the second content 210 is associated with the second highest z value (second highest depth), and the first content 200 is associated with the lowest z value (lowest depth). Accordingly, after being rendered and while being displayed, the third content 220 appears the farthest from the display 140, the second content 210 appears the second farthest from the display 140, and the first content 200 appears nearest to the display 140.

Moreover, as further illustrated in FIG. 2B, there are portions of content that overlap (e.g., content layers) with each other in xy space. Namely, a first portion of the first content 200 overlaps with (e.g., partially obscures) respective portions of the first element 212, the second element 214, and the third element 216 of the second content 210. A second portion of the first content 200 overlaps with (e.g., obscures) a portion of the sixth element 226 of the third content 220. Additionally, a portion of the second content 210 overlaps with (e.g., partially obscures) respective portions of the fifth element 224 and the sixth element 226 of the third content 220.

In various circumstances, it is desirable to blur certain content based on relative depths of the content and overlap of the content, in order to generate a certain user experience. For example, it may be desirable to blur the respective portions of the second content 210 that are obscured by the portion of the first content 200. The blurred respective portions of the second content 210 would be viewable through the portion of the first content 200, which is semi-transparent. Blurring the respective portions of the second content 210 reduces distractions of a user viewing the first content 200.

Figure 2C:
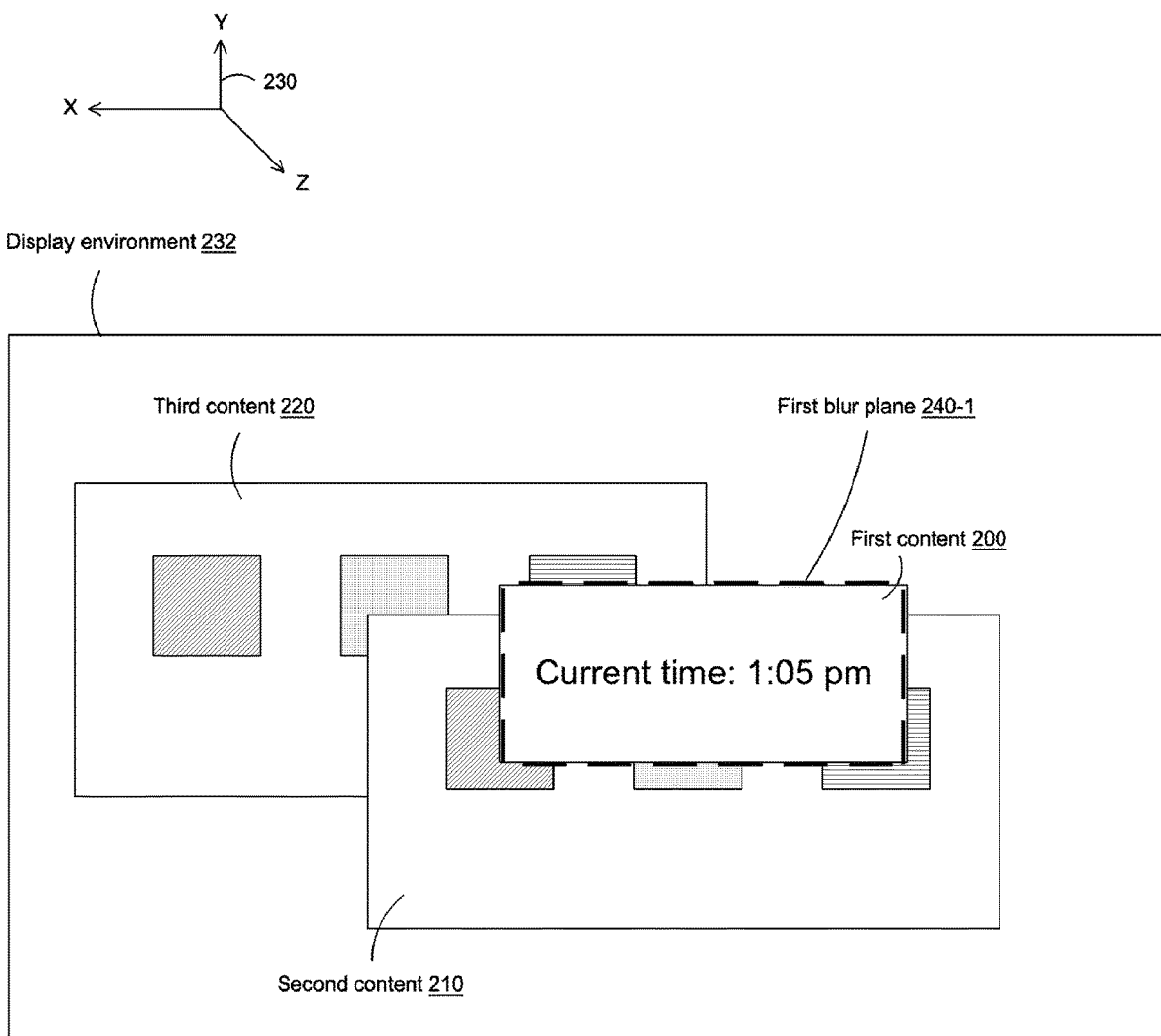

As illustrated in FIG. 2C, the stencil may indicate a first blur plane 240-1, which may approximately correspond to the area of the first content 200 in the xy space. As is described herein, based on the first blur plane 240-1 the content identifier 110 identifies a portion of content to be rendered and subsequently blurred.

For example, with reference to FIG. 1A, the stencil includes a first reference value of the plurality of reference values 103 that indicates the first blur plane 240-1. For example, the first reference value uniquely indicates the first blur plane 240-1. Continuing with this example, the first reference value may be 'one' (1), a second reference value (that indicates a second blur plane) may be 'two' (2), a third reference value (that indicates a third blur plane) may be 'three' (3), etc.

Figure 3A:
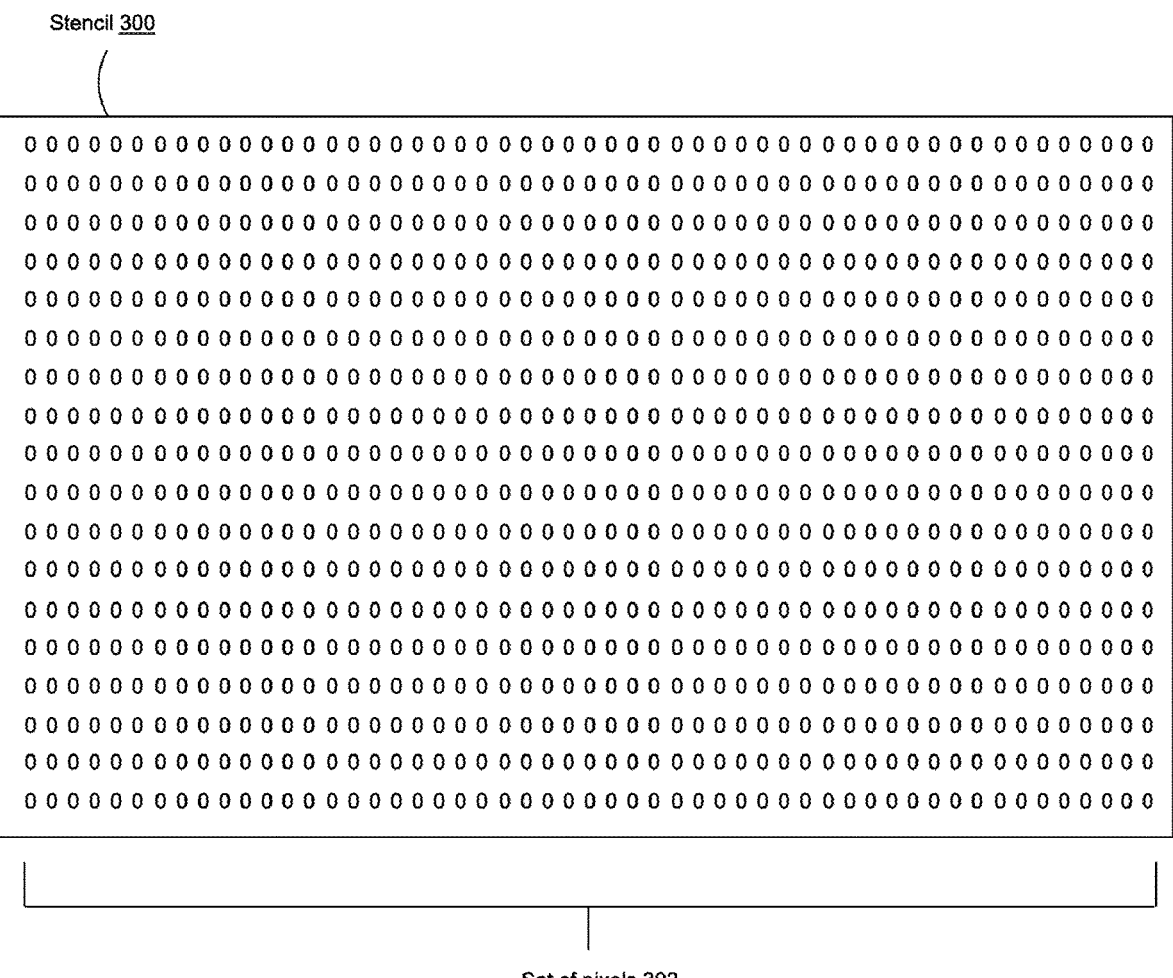
FIGS. 3A-3E are an example of modifying pixel values of a stencil in accordance with some implementations.
Figure 3B:
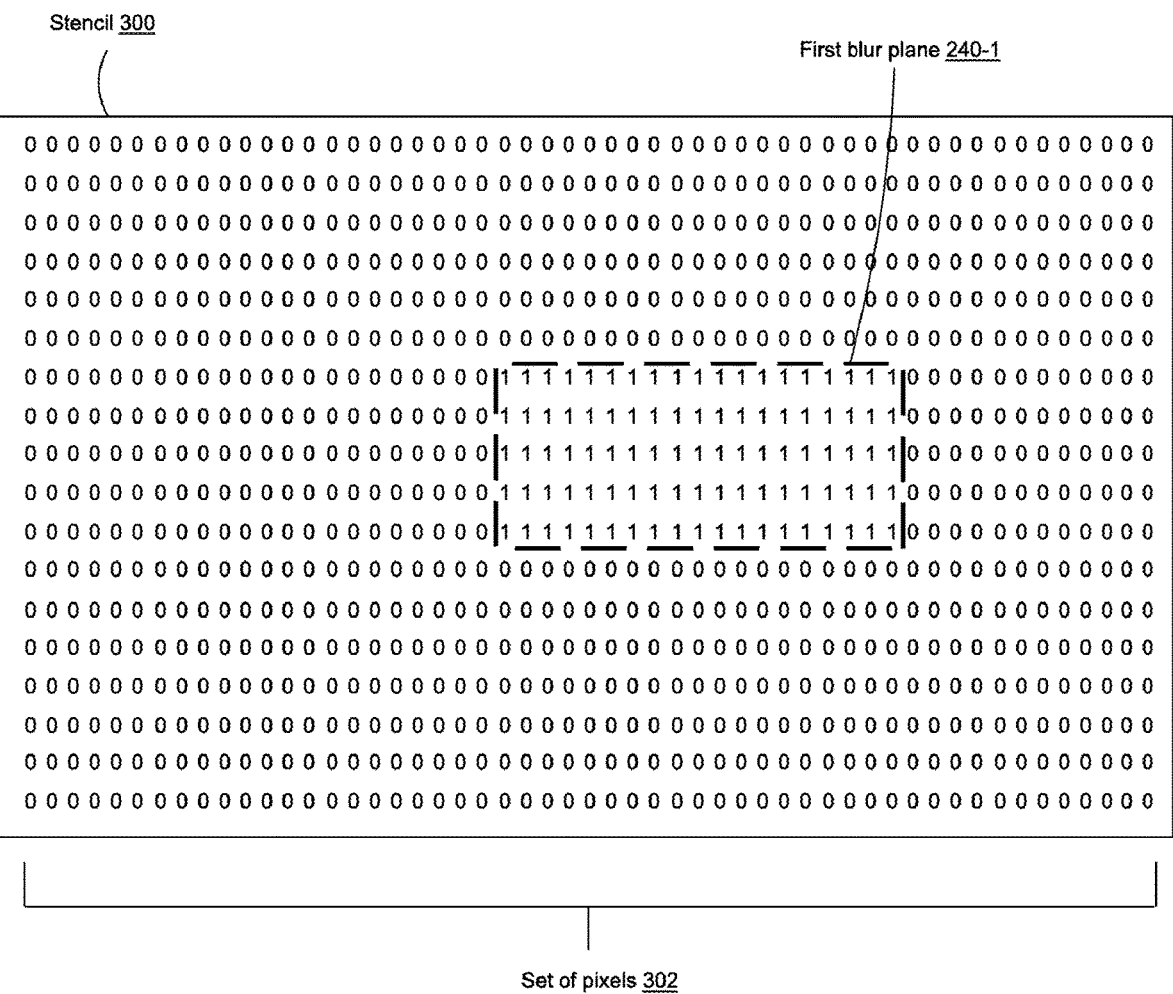

As another example, with reference to FIG. 1B, in order to generate a stencil, the stencil generator 150, via the incrementer 152, increments a first subset of pixel values of the stencil to generate the first blur plane 240-1. Continuing with this example and with reference to FIGS. 3A and 3B, the incrementer 152 increments each of the first subset of pixel values of a stencil 300 from zero to one. As illustrated in FIG. 3B, the first subset of pixel values is respectively associated with a first subset of pixels of the stencil 300, wherein the first subset of pixels corresponds to the first blur plane 240-1.

Figure 2D:
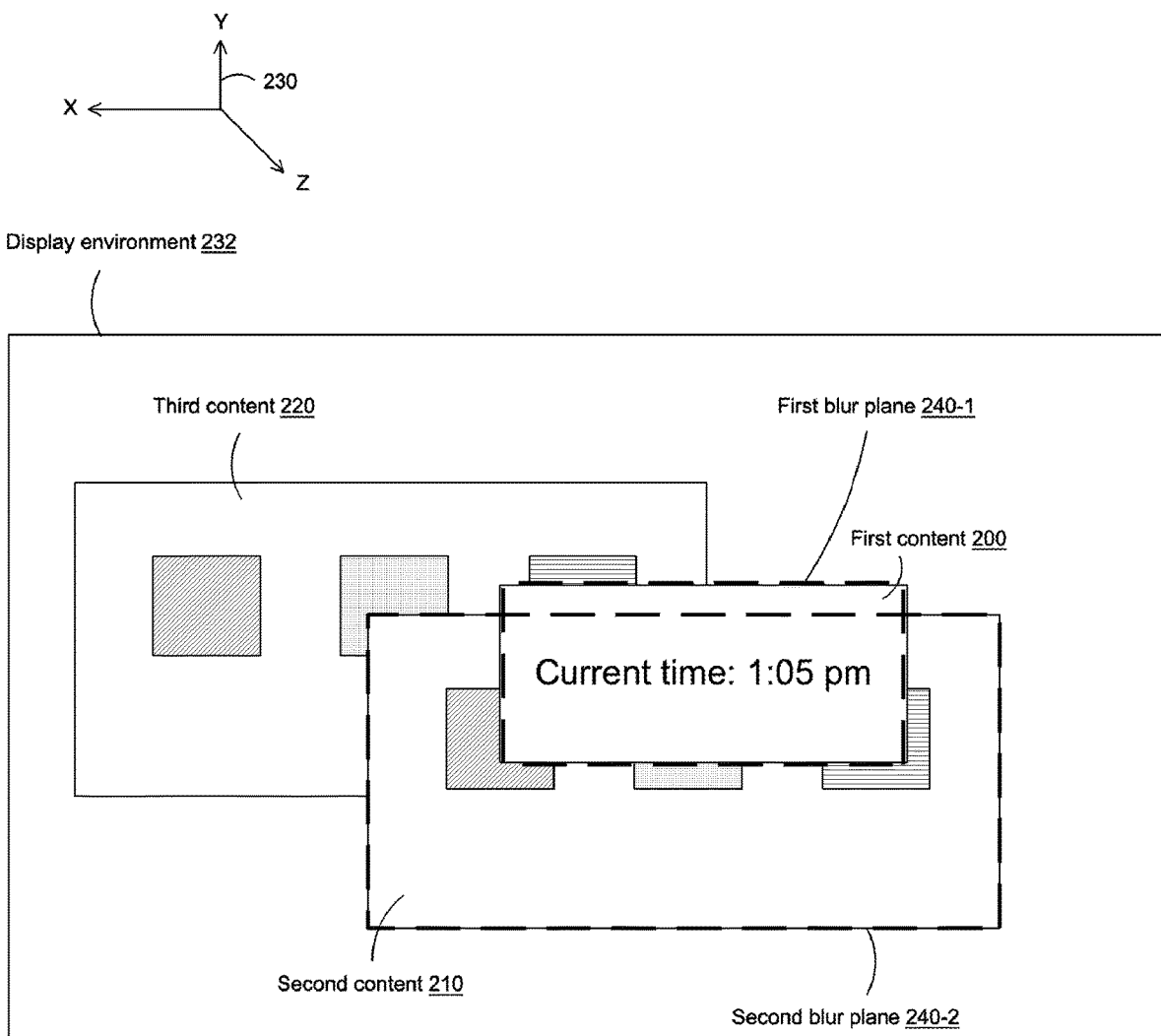

As illustrated in FIG. 2D, the stencil may indicate a second blur plane 240-2, which may approximately correspond to the area of the second content 210 in the xy space. The second blur plane 240-2 is of a greater depth than the first blur plane 240-1. As is described herein, based on the second blur plane 240-2 the content identifier 110 identifies a portion of content to be rendered and subsequently blurred.

In some implementations, the stencil used by the first system 100a includes a second reference value that indicates the second blur plane 240-2.

Figure 3C:
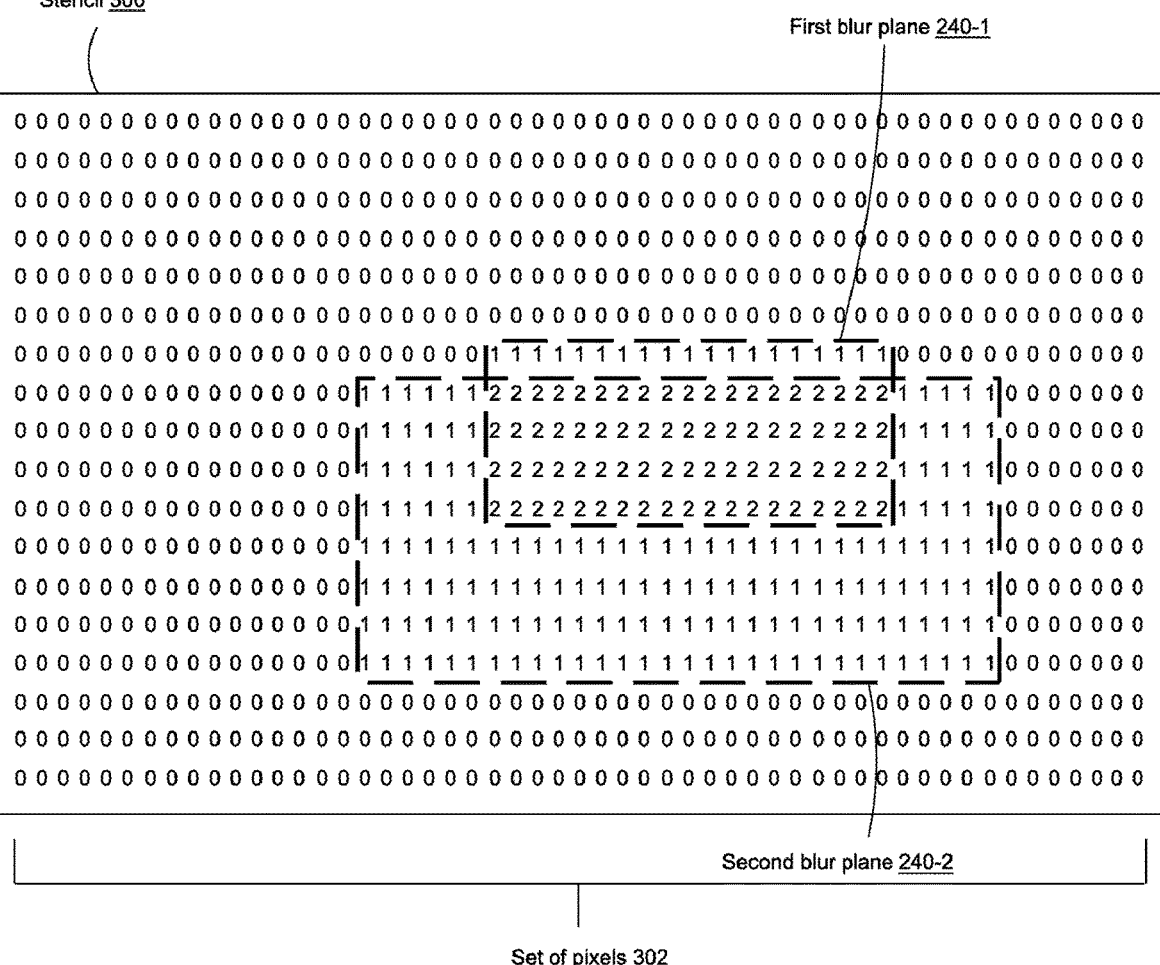

As another example, in some implementations, the stencil generator 150, via the incrementer 152, increments a second subset of pixel values of the stencil to generate the second blur plane 240-2. Continuing with this example and with reference to FIGS. 3B and 3C, the incrementer 152 increments each of the second subset of pixel values of the stencil 300 to generate the second blur plane 240-2. As illustrated in FIG. 3C, the second subset of pixel values is respectively associated with a second subset of pixels of the stencil 300, wherein the second subset of pixels corresponds to the second blur plane 240-1. Notably, certain pixels of the stencil 300 have pixel values of two. These pixels indicate a region of the stencil 300 in each of the first blur plane 240-1 and the second blur plane 240-2 exists in the xy space.

As illustrated in FIG. 2E, in some implementations, the content identifier 110 identifies a portion 260 of the third content 220 that corresponds to the second blur plane 240-2. The portion 260 includes a sub-portion of the fifth element 224 and a sub-portion of the sixth element 226. The lower part of the sub-portion of sixth element 226 is behind (e.g., occluded by) respective portions of the first content 200 and the second content 210. On the other hand, the upper part of the sub-portion of the sixth element 226 is behind (e.g., occluded by) a respective portion of the first content 200, but not behind the second content 210.

In order to identify the portion 260, the content identifier 110 may include the depth subsystem 112 and the overlap subsystem 114. The depth subsystem 112 may identify the third content 220, based on the third content 220 having a depth that is greater than a depth of the second blur plane 240-2. In other words, the depth subsystem 112 identifies the third content 220 because the third content 220 is associated with a z value that is greater than a z value associated with the second blur plane 240-2. Moreover, the overlap subsystem 114 identifies the portion 260 according to a determination that the portion 260 overlaps with the second blur plane 240-2 in the xy space. Accordingly, whereas the depth subsystem 112 makes a determination with respect to the z space, the overlap subsystem 114 makes a determination with respect to the xy space.

Moreover, in some implementations, the content identifier 110 identifies the portion 260 further according to a determination that the portion 260 satisfies a chromatic condition. Referring to FIG. 2E, the second blur plane 240-2 overlaps in the xy space with white portions of the third content 220. For example, the white portions include a respective white portion between the fifth element 224 and the sixth element 226, a respective white portion to the right of the sixth element 226, and a respective white portion below the fifth element 224 and the sixth element 226. However, in some implementations, the content identifier 110 does not identify the white portions because the white portions do not satisfy the chromatic condition. Namely, the white portions are achromatic. On the other hand, the portion 260 satisfies the chromatic condition because each of the sub-portion of the fifth element 224 and the sub-portion of the sixth element 226 has a chromatic color characteristic (as indicated by respective hatch patterns), such as blue, red, green, etc.

In some implementations, the content identifier 110 identifies the portion 260 based on a color difference condition. For example, referring to FIG. 2E, the content identifier 110 identifies the portion 260 according to a determination that the colors of the portion 260 are sufficiently different from a color of an overlapping portion (in the xy space) of the second content 210. Namely, the overlapping portion of the second content 210 is white, whereas each of the sub-portion of the fifth element 224 and the sub-portion of the sixth element 226 is a non-white color.

As illustrated in FIG. 2F, in some implementations, the rendering subsystem 120 renders the portion 260 of the third content 220, in order to generate a first portion 262 of the blur render 122.

In some implementations, in response to rendering the portion 260, the first system 100a cycles from the second reference value to the first reference value, which indicates the first blur plane 240-1. In various implementations, the first system 100a cycles through each of the plurality of the reference values, and uses the current reference value in order to identify and render corresponding content (such as was described with reference to FIGS. 2E and 2F).

Figure 3D:
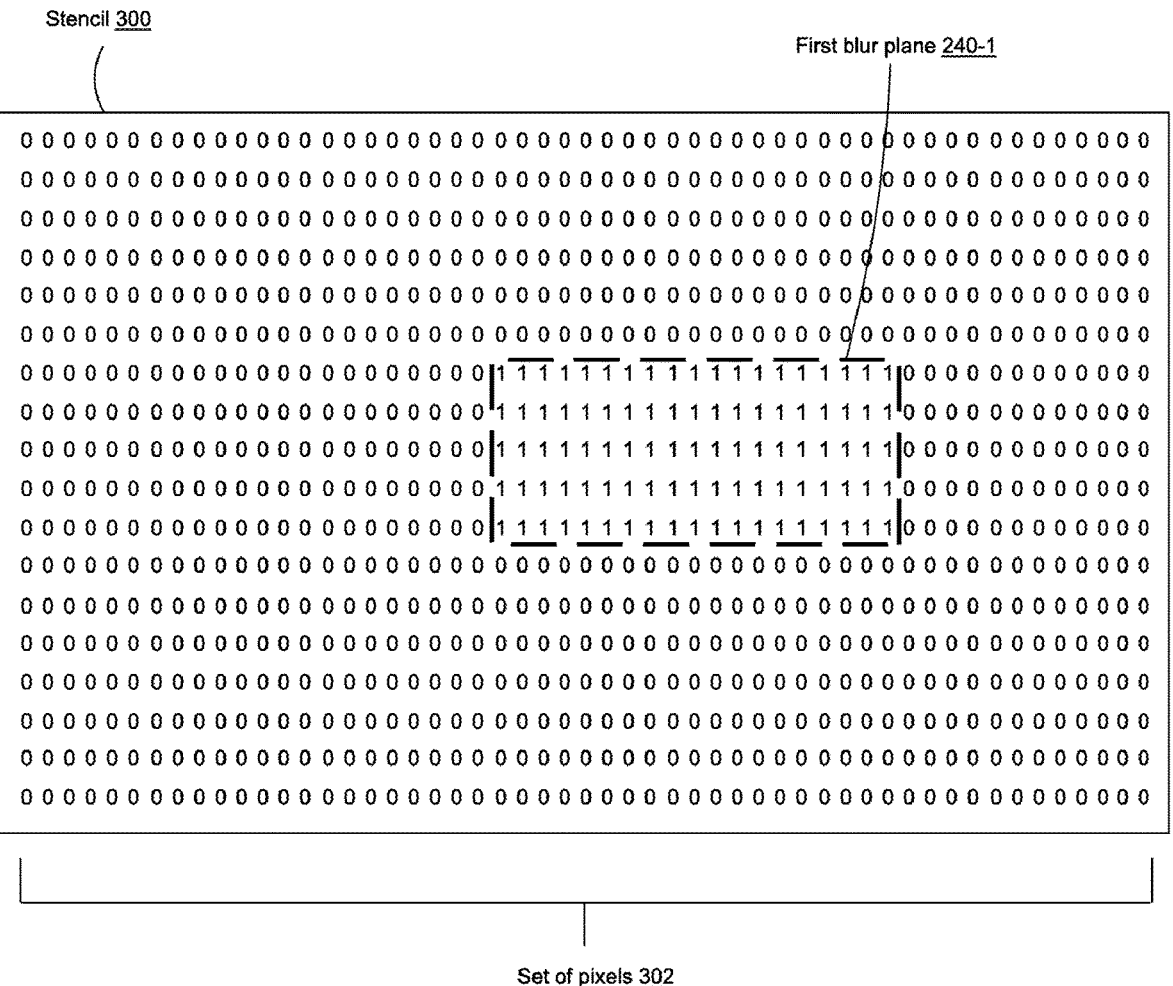

In some implementations, in response to rendering the portion 260, the second system 100b decrements each of the second subset of pixel values, as illustrated in FIGS. 3C and 3D. To that end, in some implementations, the second system 100b includes a decrementer 170 that performs the decrements. Accordingly, as illustrated in FIG. 3D, the stencil 300 indicates the first blur plane 240-1, but the stencil 300 no longer indicates the second blur plane 240-2.

Figure 2G:
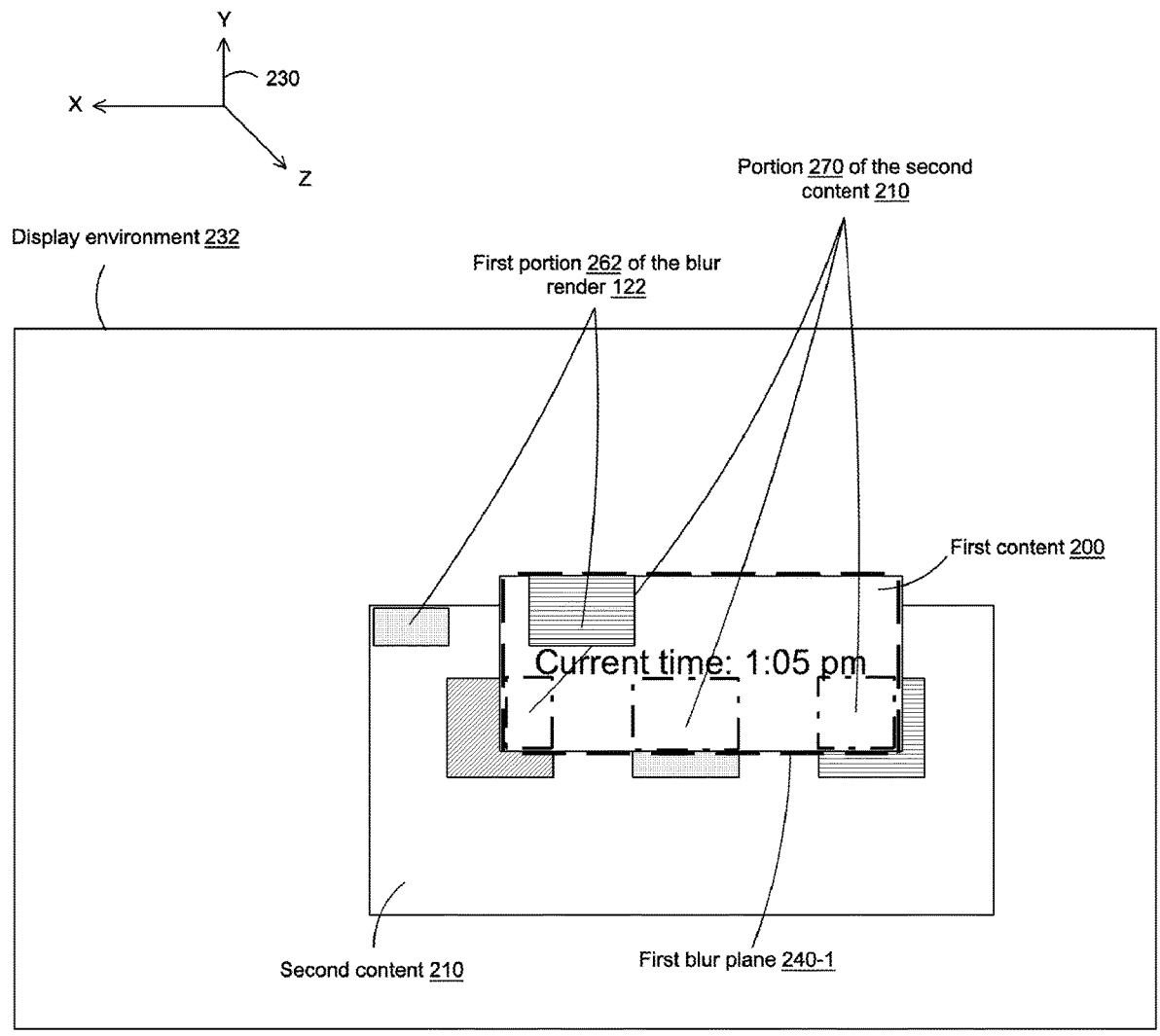

As illustrated in FIG. 2G, in some implementations, the content identifier 110 identifies a portion 270 of the second content 210 that corresponds to the first blur plane 240-1. The portion 270 includes a sub-portion of the first element 212, a sub-portion of the second element 214, and a sub-portion of the third element 216. In order to identify the portion 270, the depth subsystem 112 identifies the second content 210, based on the second content 210 having a depth that is greater than a depth of the first blur plane 240-1. In other words, the depth subsystem 112 identifies the second content 210 because the second content 210 is associated with a z value that is greater than a z value associated with the first blur plane 240-1. Moreover, the overlap subsystem 114 identifies the portion 270 according to a determination that the portion 270 overlaps with the first blur plane 240-1 in the xy space. Moreover, in some implementations, the content identifier 110 does not identify white portions of the second content 210 that overlap with the first blur plane 240-1 in the xy space. For example, the white portions do not satisfy the chromatic condition, or the white portions do not satisfy the color difference condition with respect to overlapping portions of the first content 200 in the xy space.

Figure 2H:
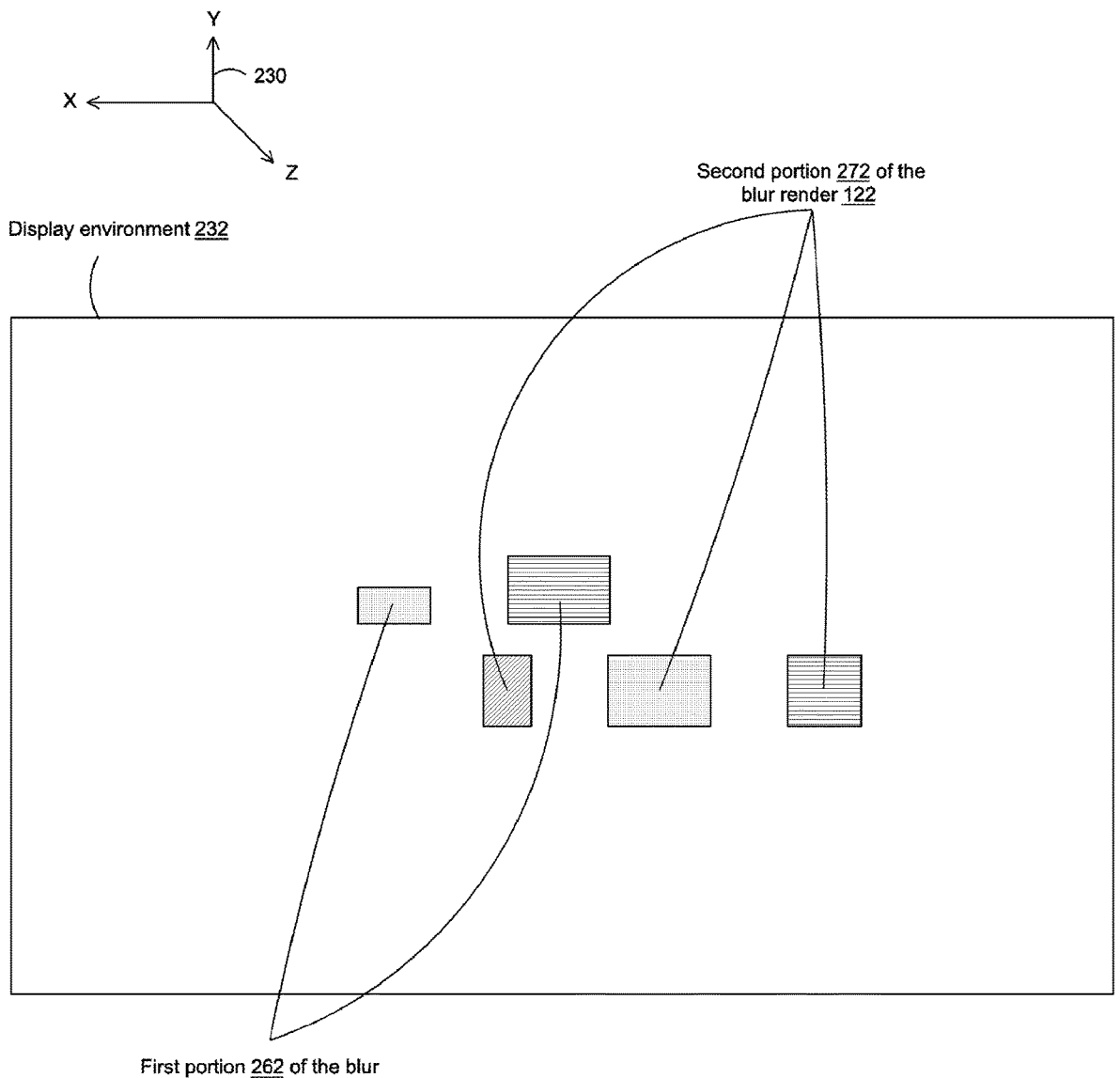

As illustrated in FIG. 2H, in some implementations, the rendering subsystem 120 renders the portion 270 of the second content 210, in order to generate a second portion 272 of the blur render 122.

In some implementations, in response to rendering the portion 270, the first system 100a determines that each of the plurality of reference values 103 has been utilized for content identification/rendering. For example, the plurality of reference values 103 includes first and second reference values, but not a third reference value. Determining there are no remaining unused reference values may indicate to the first system 100a that blurring the rendered content is appropriate. One of ordinary skill in the art will appreciate that, in some implementations, the plurality of reference values 103 may include more than two reference values. For example, the plurality of reference values 103 may include a third reference value that indicates a third blur plane.

Figure 3E:
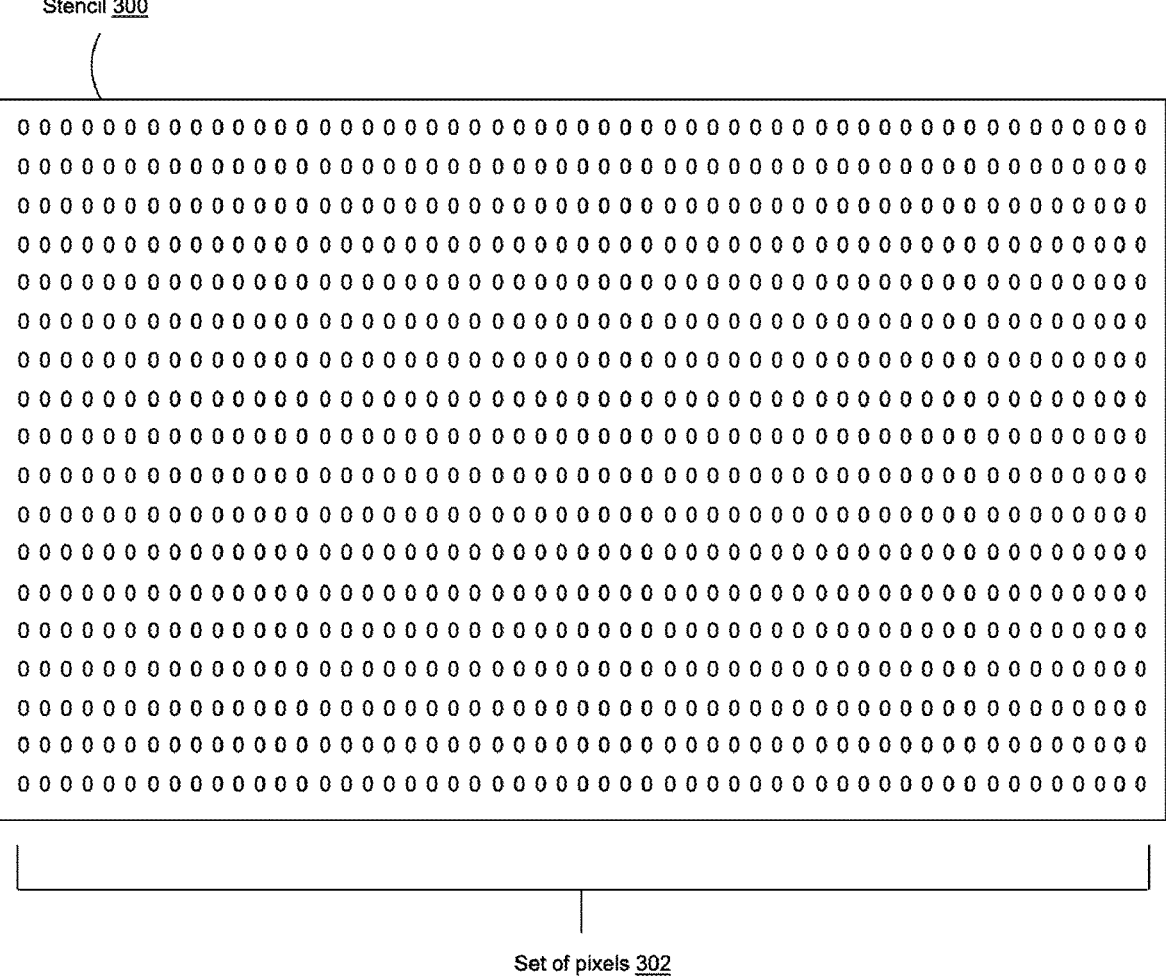

In some implementations, in response to rendering the portion 270, the second system 100b decrements, via the decrementer 170, each of the first subset of pixel values, as illustrated in FIGS. 3D and 3E. Notably, as illustrated in FIG. 3E, each of the set of pixel values of the stencil is zero, indicating to the second system 100b that blurring the rendered content is appropriate in some implementations.

Figure 2I:
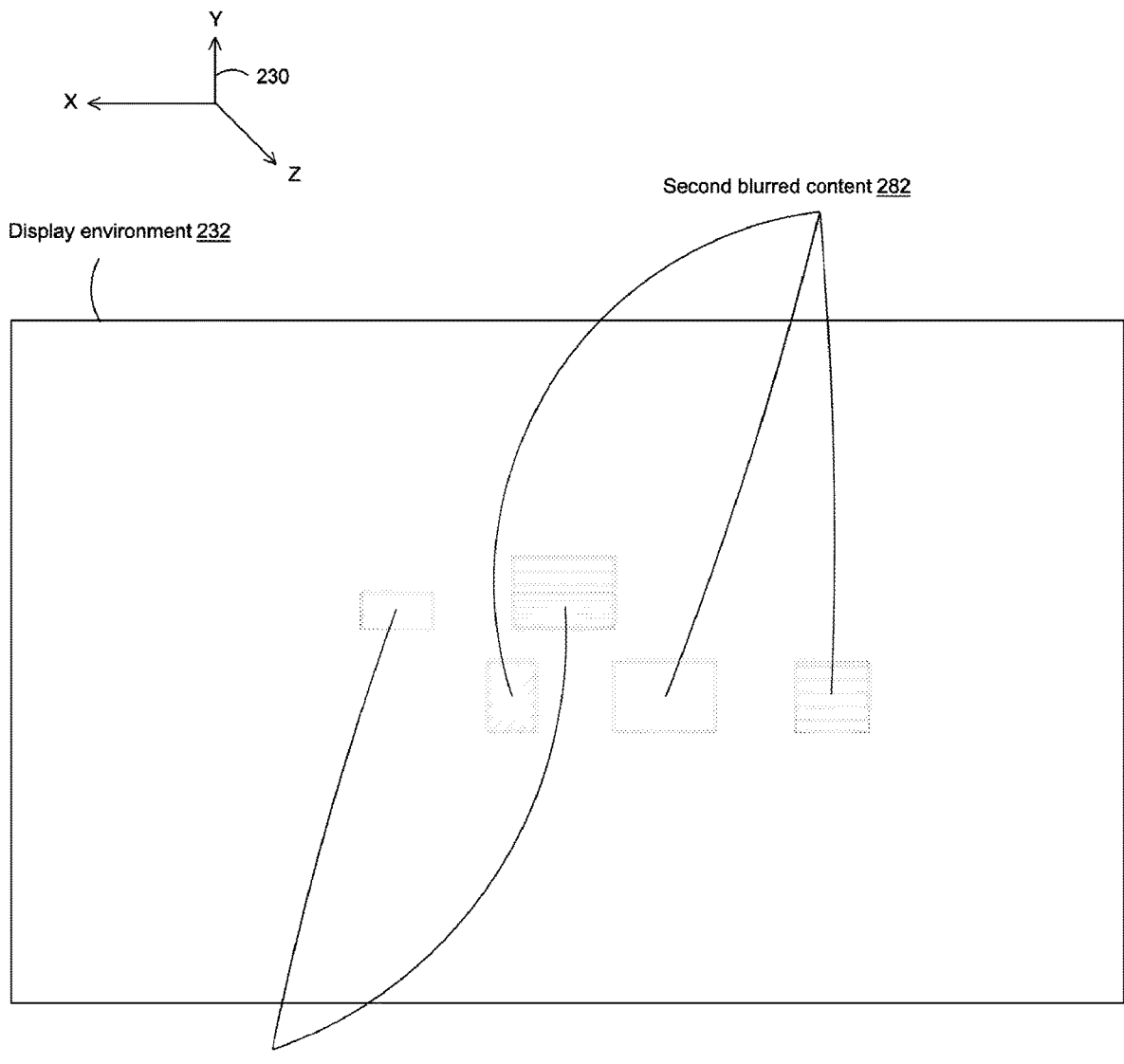

As illustrated in FIG. 2I, the blurring subsystem 130 blurs the first portion 262 of the blur render 122 to generate first blurred content 280. Moreover, the blurring subsystem 130 blurs the second portion 272 of the blur render 122 to generate second blurred content 282.

In some implementations, the rendering system 120 renders the remaining portions of content that were not identified by the content identifier 110, in order to generate the non-blur render 124. The non-blur render 124 is not blurred via the blurring subsystem 130. For example, the entirety of the first content 200 is part of the non-blur render 124 because the first content 200 is of a lower depth than respective depths of the second content 210 and the third content 220.

Figure 2J:
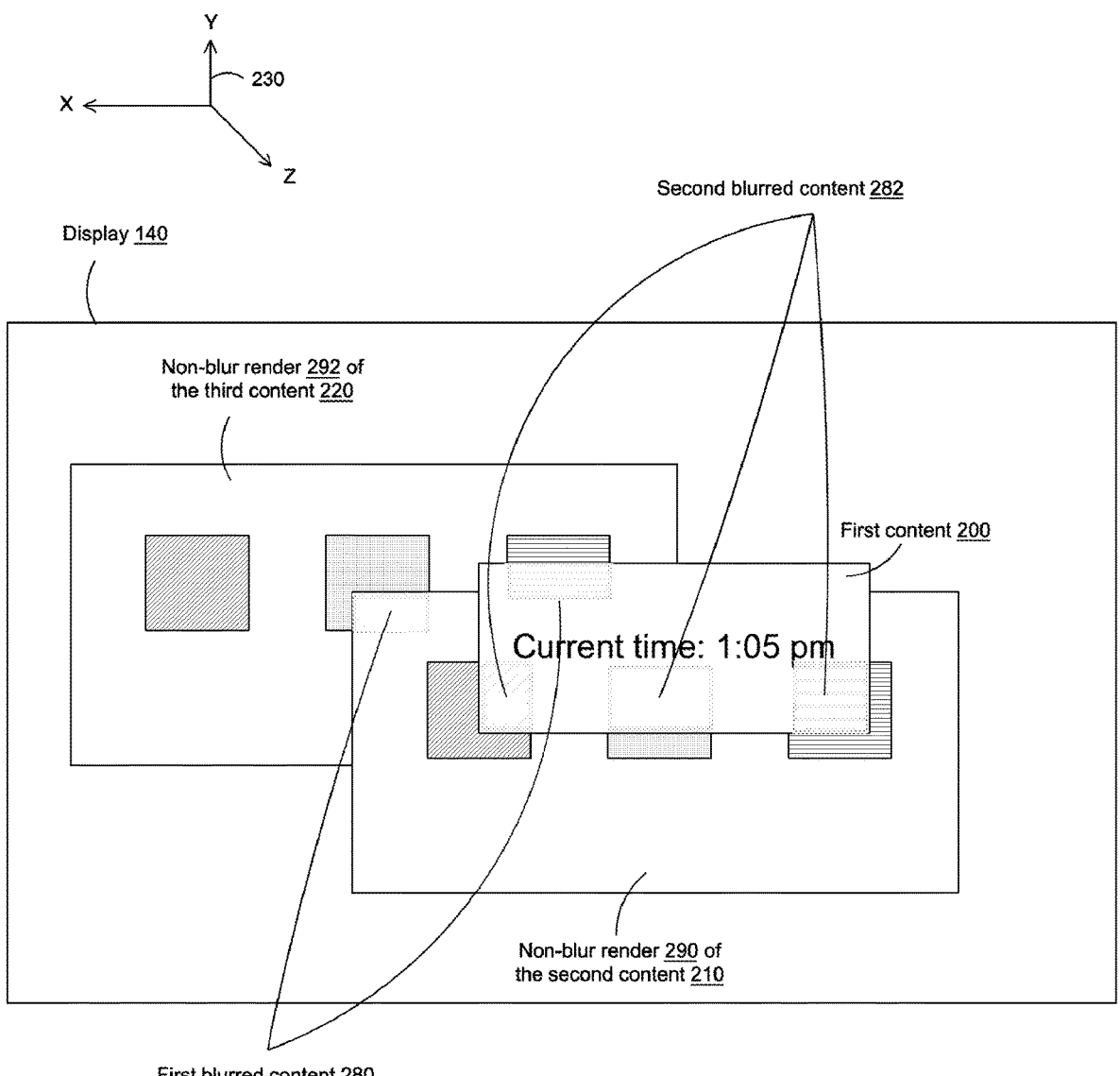

As illustrated in FIG. 2J, the display 140 displays the entirety of the first content 200, the first blurred content 280, and the second blurred content 282. Moreover, the display 140 displays a non-blur render 290 of the second content 210, and a non-blur render 292 of the third content 220. The first blurred content 280 appears behind the non-blur render 290, whereas the second blurred content 282 appears behind the first content 200. In some implementations, because the lower part of the sub-portion of the first blurred content 280 corresponding to the sixth element 226 is behind both the non-blur render 290 and the first content 200, the lower part of the sub-portion the first blurred content 280 appears fainter than the upper part of the sub-portion of the first blurred content 280, which is behind only the first content 200.

On the other hand, in some implementations, the blurring subsystem 130 blurs all portions of identified content (e.g., identified by the content identifier 110) at the same blur level. Thus, as a counterexample, the lower part of the sub-portion of the first blurred content 280 may appear as faint (e.g., same opacity) as the upper part of the sub-portion of the first blurred content 280 appears. Such implementations may be less computationally expensive than blurring different content different amounts. For example, such implementations need not compare a first number of blur planes (targeting first content) against a second number of blur planes (targeting second content).

Figure 4:
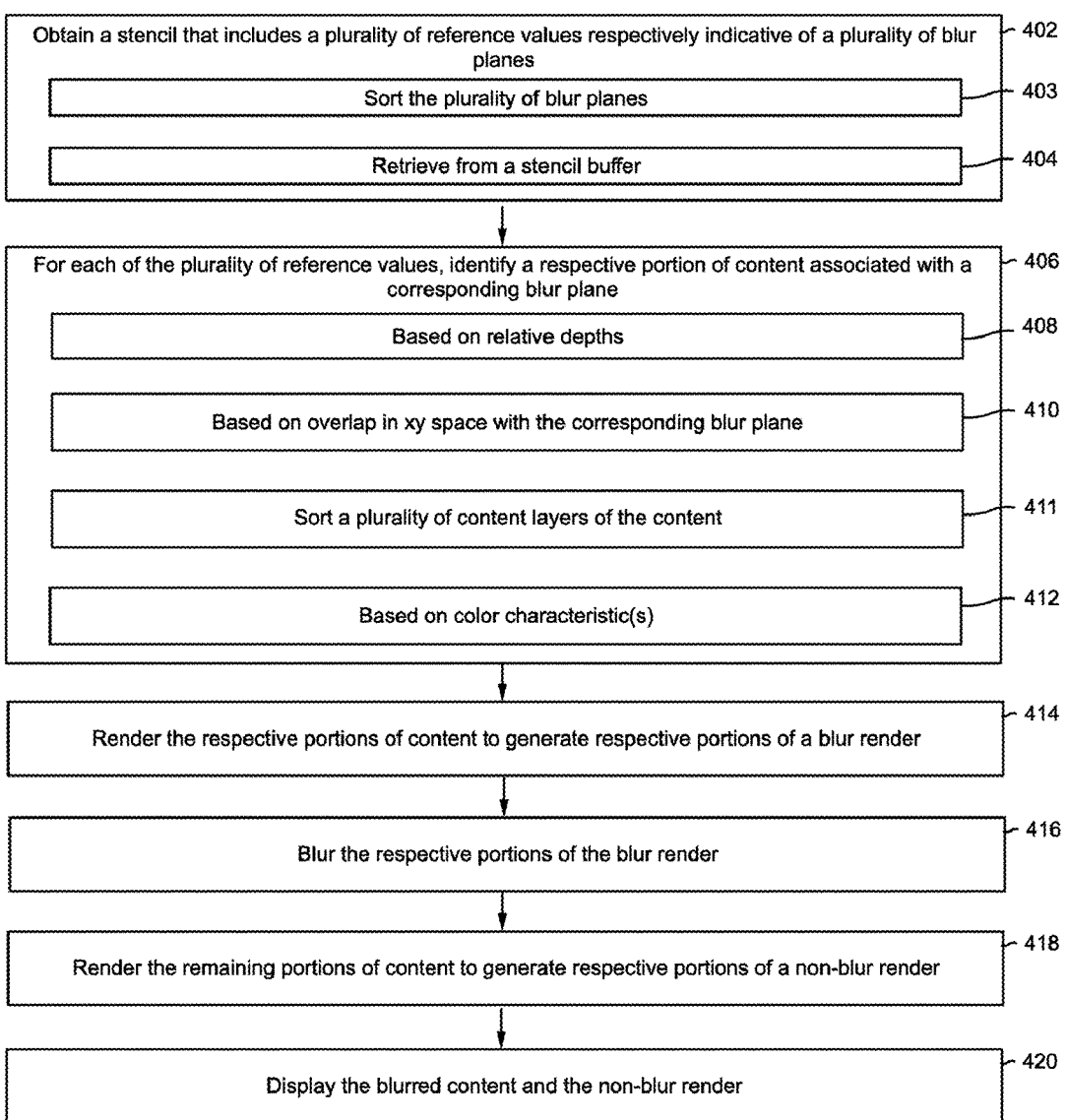
FIG. 4 is a first example of a flow diagram of a method of blurring rendered content based on a stencil in accordance with some implementations.

FIG. 4 is a first example of a flow diagram of a method 400 of blurring rendered content based on a stencil in accordance with some implementations. In various implementations, the method 400 or portions thereof are performed by an electronic device, such as a mobile device (e.g., a tablet, smartphone HMD, etc.). In various implementations, the method 400 or portions thereof are performed by the first system 100a of FIG. 1A. In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes obtaining a stencil that includes a plurality of reference values respectively indicative of a plurality of blur planes, such as the plurality of reference values 103 illustrated in FIG. 1A. In some implementations, the method 400 includes generating the stencil, such as described with reference to FIGS. 6A-6C. As another example, with reference to FIG. 2D, the stencil includes first and second reference values respectively indicative of the first blur plane 240-1 and the second blur plane 240-2. In some implementations, each of the plurality of reference values uniquely indicates (e.g., uniquely identifies) a corresponding blur plane. Accordingly, in some implementations, each of the plurality of reference values is different from each of the remainder of the plurality of reference values. Moreover, each of the plurality of blur planes may be associated with a distinct depth. For example, with reference to FIG. 2D, the first blur plane 240-1 is associated with a respective depth that is greater than a respective depth associated with the first content 200, but less than a respective depth associated with the second content 210 and less than a respective depth associated with the third content 220. On the other hand, the second blur plane 240-2 is associated with a respective depth that is greater than the respective depth associated with the first content 200, and greater than the respective depth associated with the second content 210. Accordingly, the first blur plane 240-1 targets the second content 210 and the third content 220, because the second content 210 and the third content 220 are directly behind the first blur plane 240-1. On the other hand, the second blur plane 240-2 targets the third content 220, because the third content 220 is directly behind the second blur plane 240-2.

As represented by block 403, in some implementations, the method 400 includes generating the stencil by sorting the plurality of blur planes with respect to each other. For example, the method 400 includes sorting the plurality of blur planes from back to front (e.g., from highest depth to lowest depth), and populating the stencil based on the sorting. Continuing with this example, the method 400 includes populating the stencil with a reference value of one in order to indicate the furthest back blur plane, populating the stencil with a reference value of two in order to indicate the second furthest back blur plane, etc., until the final step of populating the stencil with a reference value of N for the nearest blur plane. In this example, N is the total number of the plurality of blur planes.

As represented by block 404, in some implementations, the stencil is obtained from a stencil buffer, such as the stencil datastore 102 illustrated in FIG. 1A. In some implementations, the stencil buffer and a depth buffer are allocated in the non-transitory memory of an electronic device performing the method 400. For example, the stencil buffer stores the stencil, and the depth buffer stores depth values respectively indicating depths of corresponding content. In some implementations, the stencil buffer and the depth buffer are co-located or closely located in the non-transitory memory, in order to improve the efficiency of performing interdependent memory operations. In some implementations, the method 400 includes storing the first reference value at a location in the stencil buffer while identifying a portion of first content (described with reference to blocks 406-412), and in response to rendering the portion of the first content (described with reference to block 414), overwriting the first reference value with the second reference value at the location in the stencil buffer.

As represented by block 406, in some implementations, the method 400 includes, for each of the plurality of reference values, identifying a respective portion of content associated with a corresponding blur plane. In some implementations, identifying the respective portion of the content is via the content identifier 110 of the first system 100*a* illustrated in FIG. 1A. For example and with reference to FIG. 2E, the depth subsystem 112 determines, for the second reference value, that the third content 220 is behind (has a greater z value than) the second blur plane 240-2, and the overlap subsystem 114 identifies the portion 260 of the third content 220 that overlaps with the second blur plane 240-2 in xy space. As another example and with reference to FIG. 2G, the depth subsystem 112 determines, for the first reference value, that the second content 210 is behind (has a greater z value than) the first blur plane 240-1, and the overlap subsystem 114 identifies the portion 270 of the second content 210 that overlaps with the first blur plane 240-1 in the xy space. Accordingly, as represented by block 408, the method 400 may include identifying content based on relative depths of content and a blur plane. Moreover, as represented by block 410, the method 400 may include identifying a portion of the content based on determining that the portion of the content overlaps with the blur plane in the xy space.

In some implementations, the content includes a plurality of content layers respectively associated with a plurality of depths. For example, with reference to FIG. 2B, the content includes a first content layer 200 at the lowest depth, a second content layer 210 at a middle depth, and a third content layer 220 at the highest depth. Moreover, in some implementations, as represented by block 411, identifying the respective portion of content associated with the corresponding blur plane for each of the plurality of reference values includes sorting the plurality of content layers against each other. Continuing with the previous example, the method includes sorting each of the first content layer 200, the second content layer 210, and the third content layer 220 with respect to each other, based on respective depth of the three content layers. For example, the content is sorted back to front (e.g., highest depth to lowest depth), similar to the sorting of the plurality of blur planes described with reference to block 403.

In some implementations, sorting the plurality of blur planes and sorting of the plurality of content layers enables the method 400 to identify (and subsequently render) a content layer associated with a corresponding blur plane. For example, after sorting the plurality of blur planes and sorting of the plurality of content layers, the method 400 includes assigning each of the plurality of the layers a corresponding reference value, as indicated by the stencil. As one example, a plurality of content layers includes a first content layer having a lowest depth, a second content layer having a middle depth, and a third content layer having a highest depth. Continuing with this example, the method 400 includes assigning a reference value of three to the first content layer according to a determination that the first content layer is behind (e.g., higher depth than) a third blur plane and in front of (e.g., lower depth than) a second blur plane. Continuing with this example, the method 400 includes assigning a reference value of two to the second content layer according to a determination that the second content layer is behind (e.g., higher depth than) the second blur plane and in front of (e.g., lower depth than) a first blur plane. Continuing with this example, the method 400 includes assigning a reference value of one to the third content layer according to a determination that the third content layer is behind (e.g., higher depth than) the first blur plane, and optionally according to a determination that the third content layer is not in front of any of the plurality of blur planes.

In some implementations, as represented by block 412, identifying a portion of content is further based on a color characteristic associated with the portion of the content. For example, with reference to FIG. 2G, the portion 270 of the second content 210 has a chromatic (e.g., non-white) color characteristic, and thus satisfies a chromatic condition. Although the overlap subsystem 114 determines that a white portion of the second content 210 overlaps with the first blur plane 240-1, the white portion is not identified as part of the portion 270 because the white portion does not satisfy the chromatic condition.

As represented by block 414, the method 400 includes, for each of the plurality of reference values, rendering the respective (identified) portion of content associated with a corresponding blur plane, in order to generate a respective portion of a blur render. In order to render a respective portion of content, an electronic device or a system performing the method 400 may include a rendering subsystem. The rendering subsystem may include a GPU that performs the rendering. For example, referring to FIG. 1A, the rendering subsystem 120 renders the portion 260 of the third content 220, and renders the portion 270 of the second content 210, in order to generate respective portions of the blur render 122. The respective portions of the blur render 122 are illustrated in FIG. 2H.

As represented by block 416, the method 400 includes blurring the respective portions of the blur render to generate blurred content. For example, with reference to FIG. 1A, the blurring subsystem 130 of the first system 100*a* blurs the respective portions of the blur render 122, to generate the blurred content 132. The respective portions of the blurred content 132 are illustrated in FIG. 2I. In some implementations, the entirety of the blur render 122 is blurred during a single blurring operation, thereby reducing utilization of processing resources, as compared with other blurring techniques. Thus, in contrast to other techniques that include performing multiple blur operations in order to blur multiple rendered content, various implementations disclosed herein include performing a single blur operation with respect to the multiple rendered content (multiple portions of the blur render 122).

As represented by block 418, in some implementations, the method 400 includes generating a non-blur render by rendering, for each of the plurality of reference values, a remaining portion of the content. In some implementations, the method 400 includes foregoing blurring the non-blur render. For example, with reference to FIG. 1A, the first system 100a generates, via the rendering subsystem 120, the non-blur render 124. The remaining portion of content includes portions of the content that were not identified by the content identifier 110. For example, with reference to FIG. 2G, the remaining portion of the second content 210 include the entirety of the second content 210, excluding the identified portion 270 of the second content 210.

As represented by block 420, in some implementations, the method 400 includes concurrently displaying the blurred content and the non-blur render. For example, with reference to FIG. 2J, the display 140 displays the first blurred content 280, the second blurred content 282, and the non-blur render. The non-blur render includes the entirety of the first content 200, the non-blur render 290 of the second content 210, and the non-blur render 292 of the third content 220.

FIG. 5 is a second example of a flow diagram of a method 500 of blurring rendered content based on a stencil in accordance with some implementations. In various implementations, the method 500 or portions thereof are performed by an electronic device, such as a mobile device (e.g., a tablet, smartphone HMD, etc.). In various implementations, the method 500 or portions thereof are performed by the second system 100b of FIG. 1B. In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes generating a stencil that includes a set of pixel values respectively associated with a set of pixels of the stencil. To that end, in some implementations, the second system 100b includes the stencil generator 150 for generating the stencil. Moreover, in some implementations, the second system 100b includes the pixel value datastore 154, which stores the pixel values of the stencil.

As represented by block 504, generating the stencil includes incrementing a plurality of subsets of pixel values to respectively generate a plurality of blur planes. To that end, in some implementations, the stencil generator 150 includes the incrementer 152 that increments the plurality of subsets of pixel values. Each of the plurality of blur planes may be associated with a distinct depth, such as described with reference to FIGS. 2C and 2D. In some implementations, generating the stencil includes initializing each of the set of pixel values. For example, as illustrated in FIG. 3A, the stencil generator 150 sets each of the set of pixel values of the set of pixels 302 of the stencil 300 to zero.

As represented by block 506, in some implementations, incrementing the plurality of subsets of pixel value includes incrementing each of a first subset of the pixel values associated with a first subset of pixels of the stencil, in order to generate a first blur plane corresponding to the first subset of pixels. For example, in order to generate the first blur plane 240-1 illustrated in FIG. 2C, the incrementer 152 increments certain pixel values of the stencil 300 from zero to one, as illustrated in FIGS. 3A and 3B.

As represented by block 508, in some implementations, incrementing the plurality of subsets of pixel value includes incrementing each of a second subset of the pixel values associated with a second subset of pixels of the stencil, in order to generate a second blur plane corresponding to the second subset of pixels. For example, in order to generate the second blur plane 240-2 illustrated in FIG. 2D, the incrementer 152 increments some of the second subset of the pixel values from zero to one, and increments some of the second subset of the pixel values from one to two, as illustrated in FIGS. 3B and 3C. Accordingly, a particular pixel value of a particular pixel may indicate a number of the plurality of blur planes existing (e.g., overlapping) at the particular pixel.

As represented by block 510, the method 500 includes rendering a plurality of portions of content based on the plurality of subsets of pixel values to generate a blur render. Each of the plurality of portions of content is associated with a corresponding blur plane of the plurality of blur planes. Rendering a portion of content may include identifying the portion of the content, based on relative depth values and overlap, such as is described with reference to blocks 408 and 410 of FIG. 4. Moreover, in some implementations, identifying the portion of the content includes determining that the portion of the content satisfies a chromatic condition, such as is described with reference to block 412 of FIG. 4. Identifying the plurality of the portions of the content may be performed by the content identifier 110 of the second system 100b.

In some implementations, as represented by block 512, rendering the plurality of portions of content includes rendering a second portion of content based on the second subset of the pixel values, to generate a second portion of the blur render. For example, with reference to FIGS. 2E and 2F, the second system 100b uses the pixel values of the stencil 300 in FIG. 3C to identify the portion 260 of the third content 220 based on the second blur plane 240-2, and renders the portion 260 of the third content 220 via the rendering subsystem 120.

According to various implementations, in order to process the next blur plane of the plurality of blur planes, the method 500 includes, in response to rendering the second portion of the content, decrementing each of the second subset of pixel values. For example, as represented by block 514, the method 500 includes performing a first decrement operation to decrement each of the second subset of pixel values, in order to effectively clear the second blur plane 240-2 from being processed as the next blur plane. Decrementing each of the second subset of pixel values is illustrated in FIGS. 3C and 3D, in which some of the second subset of pixel values are decremented from two to one, and some of the second subset of pixel values are decremented from one to zero. For example, the decrementer 170 of the second system 100b performs the decrementing.

In some implementations, as represented by block 516, rendering the plurality of portions of content includes, after performing the first decrement operation 514, rendering a first portion of content based on the first subset of the pixel values, to generate a first portion of the blur render. For example, with reference to FIGS. 2G and 2H, the second system 100*b* uses the pixel values of the stencil 300 in FIG. 3D to identify the portion 270 of the second content 210 based on the first blur plane 240-1, and renders the portion 270 of the second content 210 via the rendering subsystem 120.

In some implementations, the method 500 includes, in response to rendering the second portion of the content, decrementing each of the first subset of pixel values. For example, as represented by block 518, the method 500 includes performing a second decrement operation to decrement each of the first subset of pixel values, in order to effectively clear the first blur plane 240-1 from being processed as the next blur plane. Decrementing each of the second subset of pixel values is illustrated in FIGS. 3D and 3E, in which each of the first subset of pixel values is decremented from one to zero. For example, the decrementer 170 of the second system 100*b* performs the decrementing. One of ordinary skill in the art will appreciate that the stencil 300 may indicate any number of blur planes, with the method 500 including performing a respective decrement of a corresponding subset of stencil values, such as described with reference to blocks 514 and 518.

As represented by block 520, the method 500 includes blurring the blur render to generate blurred content. For example, with reference to FIG. 1B, the blurring subsystem 130 blurs the blur render 122, to generate the blurred content 132. As example of generating the blurred content 132 is described with reference to FIGS. 2H and 2I. In some implementations, the blurring is in response to determining that, after performing decrementing operations, each of the pixel values of the stencil is zero, such as is illustrated in FIG. 3E.

As represented by block 522, in some implementations, the method 500 includes generating a non-blur render by rendering the remaining portion of the first content and the remaining portion of the second content. In some implementations, the method 500 includes foregoing blurring the non-blur render. For example, with reference to FIG. 1B, the second system 100*b* generates, via the rendering subsystem 120, the non-blur render 124. The remaining portion of content includes portions of the content that were not identified by the content identifier 110. For example, with reference to FIG. 2G, the remaining portion of the second content 210 includes the entirety of the second content 210, excluding the identified portion 270 of the second content 210.

As represented by block 524, in some implementations, the method 500 includes concurrently displaying the blurred content and the non-blur render. For example, with reference to FIG. 2J, the display 140 displays the first blurred content 280, the second blurred content 282, and the non-blur render. The non-blur render includes the entirety of the first content 200, the non-blur render 290 of the second content 210, and the non-blur render 292 of the third content 220.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors and a non-transitory memory:

obtaining a stencil that includes a plurality of reference values respectively indicative of a plurality of blur planes, wherein the plurality of reference values includes first and second reference values, wherein the first reference value identifies a first blur plane of the plurality of blur planes, wherein the second reference value identifies a second blur plane of the plurality of blur planes, and wherein the first reference value is different from the second reference value;

for each of the plurality of reference values, rendering a respective portion of content associated with a corresponding blur plane, in order to generate a respective portion of a blur render; and blurring the respective portions of the blur render to generate blurred content.

2. The method of claim 1, wherein each of the plurality of reference values uniquely indicates a corresponding blur plane of the plurality of blur planes.

3. The method of claim 1, wherein each of the plurality of blur planes is associated with a distinct depth.

4. The method of claim 1 wherein rendering the respective portion of the content includes:

for the first reference value, identifying a portion of first content based on the first blur plane value, and rendering the portion of the first content to generate a first portion of the blur render; and for the second reference value, identifying a portion of second content based on the second blur plane, and rendering the portion of the second content to generate a second portion of the blur render.

5. The method of claim 4, wherein blurring the respective portions of the blur render includes blurring the first portion of the blur render and the second portion of the blur render.

6. The method of claim 4, further comprising:

storing the first reference value at a location in the non-transitory memory while identifying the portion of the first content; and in response to rendering the portion of the first content, overwriting the first reference value with the second reference value at the location in the non-transitory memory.

7. The method of claim 4, wherein:

identifying the portion of the first content includes determining that a depth of the first content is greater than a depth of the first blur plane; and identifying the portion of the second content includes determining that a depth of the second content is greater than a depth of the second blur plane.

8. The method of claim 7, wherein identifying the portion of the first content includes determining that the depth of the first content is less than the depth of the second blur plane.

9. The method of claim 7, wherein a stencil buffer and a depth buffer are allocated in the non-transitory memory, wherein the stencil is stored in the stencil buffer, and wherein the depth buffer includes first and second depth values respectively indicating the depth of the first content and the depth of the second content.

10. The method of claim 4, wherein:

identifying the portion of the first content includes determining that the portion of the first content overlaps with the first blur plane in xy space; and identifying the portion of the second content includes determining that the portion of the second content overlaps with the second blur plane in the xy space.

11. The method of claim 10, wherein the portion of the first content does not overlap with the portion of the second content in z space.

12. The method of claim 4, wherein:

identifying the portion of the first content includes determining that the portion of the first content has a color characteristic that satisfies a chromatic condition; and identifying the portion of the second content includes determining that the portion of the second content has a color characteristic that satisfies the chromatic condition.

13. The method of claim 4, wherein identifying the portion of the second content includes determining that the portion of the second content has a color characteristic that satisfies a color difference condition with respect to a color characteristic of an overlapping portion of the first content.

14. The method of claim 1, further comprising:

generating a non-blur render by rendering, for each of the plurality of reference values, a remaining portion of the content;

foregoing blurring the non-blur render; and concurrently displaying, on a display of the electronic device, the blurred content and the non-blur render.

15. An electronic device comprising:

one or more processors;

a non-transitory memory; and one or more programs, wherein the one or more programs are stored in the non-transitory memory and configured to be executed by the one or more processors, the one or more programs including instructions for:

obtaining a stencil that includes a plurality of reference values respectively indicative of a plurality of blur planes, wherein each of the plurality of reference values uniquely indicates a corresponding blur plane of the plurality of blur planes;

for each of the plurality of reference values, rendering a respective portion of content associated with a corresponding blur plane, in order to generate a respective portion of a blur render; and blurring the respective portions of the blur render to generate blurred content.

16. The electronic device of claim 15, wherein each of the plurality of blur planes is associated with a distinct depth.

17. The electronic device of claim 15, wherein the plurality of reference values includes first and second reference values, wherein the first reference value identifies a first blur plane of the plurality of blur planes, wherein the second reference value identifies a second blur plane of the plurality of blur planes, and wherein the first reference value is different from the second reference value.

18. A non-transitory computer readable storage medium storing one or more programs, the one or more programs comprising instructions, which, when executed by an electronic device with one or more processors, cause the electronic device to:

obtain a stencil that includes a plurality of reference values respectively indicative of a plurality of blur planes, wherein each of the plurality of blur planes is associated with a distinct depth;

for each of the plurality of reference values, render a respective portion of content associated with a corresponding blur plane, in order to generate a respective portion of a blur render; and blur the respective portions of the blur render to generate blurred content.

19. The non-transitory computer readable storage medium of claim 18, wherein each of the plurality of reference values uniquely indicates a corresponding blur plane of the plurality of blur planes.

20. The non-transitory computer readable storage medium of claim 18, wherein the plurality of reference values includes first and second reference values, wherein the first reference value identifies a first blur plane of the plurality of blur planes, wherein the second reference value identifies a second blur plane of the plurality of blur planes, and wherein the first reference value is different from the second reference value.

* * * * *